United States Patent
Rios et al.

(10) Patent No.: US 6,322,698 B1
(45) Date of Patent: Nov. 27, 2001

(54) VIBRATORY SEPARATION SYSTEMS AND MEMBRANE SEPARATION UNITS

(75) Inventors: Luis Rios, Holtsville; Tony Alex, Glen Cove; Thomas C. Gsell, Glen Head, all of NY (US); Michael R. Gildersleeve, Norwood, MA (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 08/981,503

(22) PCT Filed: Jun. 28, 1996

(86) PCT No.: PCT/US96/11207

§ 371 Date: Aug. 4, 1998

§ 102(e) Date: Aug. 4, 1998

(87) PCT Pub. No.: WO97/02087

PCT Pub. Date: Jan. 23, 1997

Related U.S. Application Data

(60) Provisional application No. 60/000,607, filed on Jun. 30, 1995.

(51) Int. Cl.[7] ............................................. B01D 63/08
(52) U.S. Cl. ................... 210/321.75; 210/231; 210/232; 210/321.69; 210/488; 210/433.1; 210/380.1; 210/360.1; 210/636; 210/650
(58) Field of Search ............................. 210/231, 232, 210/321.69, 321.75, 488, 433.1, 380.1, 334, 414, 360.1, 388, 636, 650

(56) References Cited

U.S. PATENT DOCUMENTS 1,632,718  6/1927  Wallace .
2,220,164  11/1940  List .
2,353,492  7/1944  O'Connor .
2,382,492  8/1945  Lomax .
2,418,982  4/1947  O'Connor .

(List continued on next page.)

FOREIGN PATENT DOCUMENTS

| 450360 | 7/1968 | (CH) . |
| 120800 | 7/1976 | (DE) . |
| 3127362 | 7/1981 | (DE) . |
| 210387 | 6/1984 | (DE) . |

(List continued on next page.)

OTHER PUBLICATIONS

Cheng, K.S.; "Thin Cake Filtration: Theory and Practice", Millipore Corporation, pp. 42–50.

Millipore Corporation; "Concentration and Desalting with Immersible CX Ultrafilters", pp. 1–8.

Primary Examiner—Ana Fortuna
(74) Attorney, Agent, or Firm—Leydig, Voit & Mayer, Ltd.

(57) ABSTRACT

A vibratory separation system having a drive mechanism for imparting a vibratory motion to a membrane module to enhance filtration. The membrane module comprises one or more filter elements secured to one another, each having a permeable membrane. The vibratory motion imparted to the membrane module generates a dynamic flow boundary layer at the permeable membranes. This fluid shear boundary layer, in turn, generates lift, thereby inhibiting fouling of the membranes.

69 Claims, 13 Drawing Sheets

U.S. PATENT DOCUMENTS

| | | |
|---|---|---|
| 2,636,719 | 4/1953 | O'Connor . |
| 2,947,181 | 8/1960 | Carrier, Jr. et al. . |
| 2,951,581 | 9/1960 | Long et al. . |
| 3,002,915 | 10/1961 | Royder . |
| 3,197,922 | 8/1965 | Smith . |
| 3,212,643 | 10/1965 | Schmidt, Jr. et al. . |
| 3,315,793 | 4/1967 | Yakubovich . |
| 3,385,253 | 5/1968 | Mathey . |
| 3,447,690 | 6/1969 | Kracklauer . |
| 3,455,821 | 7/1969 | Aremaa . |
| 3,491,021 | 1/1970 | Huntington . |
| 3,491,022 | 1/1970 | Huff . |
| 3,513,090 | 5/1970 | Migule et al. . |
| 3,572,139 | 3/1971 | Shatto, Jr. et al. . |
| 3,583,246 | 6/1971 | Stable et al. . |
| 3,622,286 | 11/1971 | Gaddy . |
| 3,645,344 | 2/1972 | Bodine . |
| 3,695,443 | 10/1972 | Schmidt, Jr. . |
| 3,785,969 | 1/1974 | Mölls et al. . |
| 3,796,313 | 3/1974 | Bigt et al. . |
| 3,864,249 | 2/1975 | Wallis . |
| 3,870,640 | 3/1975 | Reece . |
| 3,884,805 | 5/1975 | Bagdasarian et al. . |
| 3,968,241 | 7/1976 | DeFelice . |
| 3,970,564 | 7/1976 | Shamsutdinov et al. . |
| 4,007,825 | 2/1977 | Spurlin et al. . |
| 4,025,425 | 5/1977 | Croopnick et al. . |
| 4,028,232 | 6/1977 | Wallis . |
| 4,062,768 | 12/1977 | Elliot . |
| 4,070,280 | 1/1978 | Bray . |
| 4,076,623 | 2/1978 | Golston . |
| 4,132,649 | 1/1979 | Croonpick et al. . |
| 4,136,035 | 1/1979 | Bogomolov et al. . |
| 4,166,034 | 8/1979 | Bodine . |
| 4,208,289 | 6/1980 | Bray . |
| 4,228,015 | 10/1980 | De Vries et al. . |
| 4,253,962 | 3/1981 | Thompson . |
| 4,266,434 | 5/1981 | Burns . |
| 4,279,751 | 7/1981 | Fishgal . |
| 4,310,416 | 1/1982 | Tanaka et al. . |
| 4,312,756 | 1/1982 | Hug . |
| 4,343,705 | 8/1982 | Legg . |
| 4,346,011 | 8/1982 | Brownstein . |
| 4,368,628 | 1/1983 | Jacobsen . |
| 4,409,782 | 10/1983 | Westergaard et al. . |
| 4,430,218 | 2/1984 | Perl et al. . |
| 4,446,022 | 5/1984 | Harry . |
| 4,461,122 | 7/1984 | Balz . |
| 4,477,359 | 10/1984 | Perrin et al. . |
| 4,501,663 | 2/1985 | Merrill . |
| 4,517,086 | 5/1985 | Romey et al. . |
| 4,518,499 | 5/1985 | Perrin et al. . |
| 4,526,688 | 7/1985 | Schmidt, Jr. et al. . |
| 4,529,482 | 7/1985 | Richter et al. . |
| 4,545,969 | 10/1985 | Diekötter et al. . |
| 4,576,715 | 3/1986 | Michael et al. . |
| 4,605,500 | 8/1986 | Takemura et al. . |
| 4,619,532 | 10/1986 | Schmidt, III . |
| 4,626,351 | 12/1986 | Führing . |
| 4,631,130 | 12/1986 | Watanabe . |
| 4,636,312 | 1/1987 | Willis . |
| 4,637,878 | 1/1987 | Richter et al. . |
| 4,661,250 | 4/1987 | Rosenberg . |
| 4,670,147 | 6/1987 | Schoendorfer et al. . |
| 4,695,380 | 9/1987 | Hilgendorff et al. . |
| 4,698,154 | 10/1987 | Mohn et al. . |
| 4,717,486 | 1/1988 | Shirato et al. . |
| 4,735,718 | 4/1988 | Peters . |
| 4,778,279 | 10/1988 | Bodine . |
| 4,790,942 | 12/1988 | Shmidt et al. . |
| 4,836,922 | 6/1989 | Rishel et al. . |
| 4,859,070 | 8/1989 | Musschoot . |
| 4,867,876 | 9/1989 | Kopf . |
| 4,872,988 | 10/1989 | Culkin . |
| 4,895,806 | 1/1990 | Le et al. . |
| 4,900,430 | 2/1990 | Elmore et al. . |
| 4,902,418 | 2/1990 | Ziegler . |
| 4,911,847 | 3/1990 | Shmidt et al. . |
| 4,941,565 | 7/1990 | Hirota et al. . |
| 4,952,317 | 8/1990 | Culkin . |
| 5,002,667 | 3/1991 | Kutowy et al. . |
| 5,014,564 | 5/1991 | Culkin . |
| 5,069,789 | 12/1991 | Mohn et al. . |
| 5,080,770 | 1/1992 | Culkin . |
| 5,106,506 | 4/1992 | Schmidt et al. ................ 210/321.84 |
| 5,114,588 | 5/1992 | Greene . |
| 5,143,630 * | 9/1992 | Rolchigo ............................ 210/780 |
| 5,160,616 | 11/1992 | Blake-Coleman . |
| 5,200,076 | 4/1993 | Salyer . |
| 5,215,663 | 6/1993 | Greene . |
| 5,275,725 | 1/1994 | Ishii et al. . |
| 5,310,487 | 5/1994 | LaMonica ........................... 210/651 |
| 5,474,675 | 12/1995 | Kupka . |
| 5,626,752 | 5/1997 | Mohn et al. .................... 210/321.75 |

FOREIGN PATENT DOCUMENTS

| | | |
|---|---|---|
| 3715183 | 5/1987 | (DE) . |
| 4313708 | 11/1994 | (DE) . |
| 0066198 | 5/1982 | (EP) . |
| 0529682 | 12/1988 | (EP) . |
| 678302 | 7/1929 | (FR) . |
| 1405432 | 8/1972 | (GB) . |
| 1488025 | 10/1973 | (GB) . |
| 1488025 | 10/1977 | (GB) . |
| 5845766 | 10/1983 | (JP) . |
| 60194960 | 10/1985 | (JP) . |
| 62148301 | 9/1987 | (JP) . |
| 63104608 | 5/1988 | (JP) . |
| 6430603 | 2/1989 | (JP) . |
| 1203004 | 8/1989 | (JP) . |
| 275332 | 3/1990 | (JP) . |
| 2187102 | 7/1990 | (JP) . |
| 3188928 | 8/1991 | (JP) . |
| 2009694 | 3/1994 | (SU) . |
| 9500231 | 1/1995 | (WO) . |
| 9601676 | 1/1996 | (WO) . |

* cited by examiner

VIBRATORY SEPARATION SYSTEMS AND MEMBRANE SEPARATION UNITS This application claims the benefit of priority based on U.S. Provisional Application No. 60/000,607, which was filed on Jun. 30, 1995.

BACKGROUND OF THE INVENTION

1. Field of the Invention

The present invention relates to a vibratory separation system and a membrane module and other components which may be used in a vibratory separation system.

2. Discussion of the Prior Art

Separation devices are typically utilized to separate one or more components of a fluid from other components in the fluid. As used herein, the term "fluid" includes liquids, gases, and mixtures and combinations of liquids, gases and/or solids. A wide variety of common processes are carried out in separation devices, including, for example, classic or particle filtration, microfiltration, ultrafiltration, nanofiltration, reverse osmosis (hyperfiltration), dialysis, electrodialysis, prevaporation, water splitting, sieving, affinity separation, affinity purification, affinity sorption, chromatography, gel filtration, bacteriological filtration, and coalescence. Typical separation devices may include dead end filters, open end filters, cross-flow filters, dynamic filters, vibratory separation filters, disposable filters, regenerable filters including backwashable, blowback and solvent cleanable, and hybrid filters which comprise different aspects of the various above described devices.

Accordingly, as used herein, the term "separation" shall be understood to include all processes, including filtration, wherein one or more components of a fluid is or are separated from the other components of the fluid. The term "filter" shall be understood to include any medium made of any material that allows one or more components of a fluid to pass therethrough in order to separate those components from the other components of the fluid. The terminology utilized to define the various components of the fluid undergoing separation and the products of these processes may vary widely depending upon the application, e.g., liquid or gas filtration, and the type of separation system utilized, e.g., dead end or open end systems; however, for clarity, the following terms shall be utilized. The fluid which is input to the separation system shall be referred to as process fluid and construed to include any fluid undergoing separation. The portion of the fluid which passes through the separation medium shall be referred to as permeate and construed to include filtrate as well as other terms. The portion of the fluid which does not pass through the separation medium shall be referred to as retentate and construed to include concentrate, bleed fluid, as well as other terms.

A common problem in virtually all separation systems is blinding or fouling of the filter, for example, a permeable membrane. Permeate passing through the filter from the upstream side to the downstream side of the filter leaves a retentate layer adjacent to the upstream side of the filter having a different composition than that of the process fluid. This retentate layer may include components which bind to the filter and clog its pores, thereby fouling the filter, or may remain as a stagnant boundary layer, either of which hinders transport of the components trying to pass through the filter to the downstream side of the filter. In essence, mass transport through the filter per unit time, i.e., flux, may be reduced and the inherent sieving or trapping capability of the filter may be adversely affected.

In certain filter systems, it is well known that if the filter and the layer of fluid adjacent to the surface of the filter are moved rapidly with respect to each other, fouling of the filter is greatly reduced. Accordingly, filter life is prolonged and permeate flow rate is improved. Essentially, the two categories of separation technology which are currently utilized for developing relative motion between the fluid and the filter are cross flow filter systems and dynamic filter systems.

In cross flow systems, high volumes of fluid are typically driven through narrow passages bounded by the filter surface and possibly the inner surface of the filter housing, thereby creating the preferred movement of fluid across the filter. For example, process fluid may be pumped across the upstream surface of the filter at a velocity high enough to disrupt and back mix the boundary layer. An inherent weakness common to cross flow filter systems is that a significant pressure drop occurs between the inlet and outlet of the filter system. Specifically, the process fluid entering the filter system is under a great deal of pressure in order to develop high flow velocities; however, as the process fluid is dispersed tangentially across the upstream surface of the filter, the pressure sharply decreases. This decrease in pressure tangentially across the upstream surface of the filter causes non-uniformity in transmembrane pressure, i.e., the pressure difference through the filter between the upstream and downstream sides of the filter. This non-uniformity in transmembrane pressure tends to increase fouling of the filter. Accordingly, filter longevity and efficiency is reduced because certain areas of the filter may become fouled more rapidly than other areas. Additionally, this makes the scaling up of cross flow systems difficult. Generally, filter systems are scaled up by adding additional filter elements, but adding filter elements increases the pressure differential and induces greater non-uniformity.

Further, many components in process fluids cannot withstand the high flow rates used in cross flow filter systems. For example, the maximum allowable velocity for many biological fluids is far too low to allow adequate backmixing and thereby reduce or eliminate the stagnant boundary layer. Furthermore, the required high feed rates as compared to the filtration rates in cross flow systems require numerous feed recycles through the system, which are also undesirable.

Dynamic filter systems overcome many of the problems associated with cross flow filter systems by driving a movable structural element, such as a rotatable element, adjacent to the fluid rather than using a large pressure differential to drive the fluid across the surface of a filter. Dynamic filter systems may be constructed in various configurations. Two widely used configurations are cylinder devices and disc devices. Within each of these two configurations, numerous variations in design exist.

In cylinder devices, a cylindrical filter element is positioned concentrically next to a cylindrical shell or filter housing. The process fluid is introduced into the gap between the filter element and the shell, and either the filter element or the shell is rotated about a common axis. While the filter element or the shell is rotating one or more components of the process fluid in the gap pass through the filter element and are recovered as permeate. Cylindrical devices are highly efficient because rotating the filter element or the shell with respect to the process fluid in the gap greatly reduces fouling of the filter element. However, due to manufacturing and operational limitations, cylindrical devices cannot be made large, e.g., it is difficult to increase filter surface area because of constraints on the diameter of the filter element.

In disc devices a set of disc-shaped filter elements are stacked in parallel along a common axis and positioned within the filter housing. In these devices the fluid motion is created by rotating the filter discs, or by rotating a set of impermeable discs which are interleaved between the filter discs. Disc devices overcome some of the disadvantages of cross flow and cylinder devices but suffer from complexly of design. Further, while the ratio of the filter surface area to the housing volume in a disc device may be superior to that of a cylinder device, the ratio is still relatively low.

A common concern in many conventional dynamic filter systems is the high energy requirement for effective filtration. Typically, in rotating devices, the energy requirement may be quite high. Specifically, significant energy may be utilized to overcome the high moment of inertia of the rotating portion of the system, as well as maintaining the high rotation rates. Another concern associated with dynamic filter systems is non-uniformity in transmembrane pressure. In rotating systems, certain conditions may result in fluid dynamics that produce non-uniform transmembrane pressure which may cause preferential fouling of the filter. These conditions generally occur in the filtration of highly viscous fluids and fluids containing high concentrations of solids.

Another disadvantage associated with some conventional dynamic filter systems is that they are very difficult to clean in place, i.e., to clean without completely disassembling the system. A conventional dynamic system typically has a multi-component housing, filter unit, and rotational unit, each of which may be rife with cracks and crevices. Further, the filter unit and the rotational unit are frequently constructed and positioned within the housing in a manner which results in stagnant regions or regions of low flow velocity within the housing. These cracks, crevices, stagnant regions, and low flow velocity regions all collect and harbor contaminants which may be difficult or impossible to remove by cleaning in place. In addition, O-rings and similar seals present barriers to the flow of fluid and are thus collection areas for contaminants.

Vibratory dynamic filter systems in which the filter discs are oscillated at predetermined frequencies are also well known as is seen from an examination of the pertinent patent art. U.S. Pat. No. 4,526,688, for example, proposes a shock-type system where the membrane support structure and a filtration apparatus are periodically banged to induce the filter cake to drop from the filter. U.S. Pat. No. 4,545,969 employs a shearing plate which is oscillated parallel to a fixed filter. U.S. Pat. No. 3,970,564 discloses a system where a filter is mechanically vibrated in a direction normal to the filter. Vibrations have also been created using ultrasonic transducers such as those found in U.S. Pat. No. 4,253,962.

Typically, in vibratory dynamic filtration systems a tradeoff between filter surface area and system weight must be made. Increased surface area for filtration is always desired; however, increasing surface area usually involves increasing the overall weight of the filtration system. Weight is generally a problem for all filtration systems, due for example, to size and transportability constraints, but is of particular importance in vibratory filtration systems. As the weight of an object increases, so does its moment of inertia. Accordingly, increased weight in vibratory filtration systems means that the vibratory drives of these systems must be larger and require additional energy to overcome the increased moments of inertia, and are thereby less efficient. The current state of the art vibratory filtration system has not adequately resolved the surface area—weight tradeoff. For example, typical vibratory filtration systems comprise large, high volume housings, which are not of inconsequential weight. These systems also have low ratios of filter surface area to housing volume.

SUMMARY OF THE INVENTION

The vibratory separation systems, membrane modules, and other components of the present invention overcome the limitations of the prior art by providing a reliable, effective, efficient system which offers increased surface area available for filtration without a substantial increase in system volume. The vibratory separation systems, membrane modules, and other components may be utilized in a wide variety of separation applications.

In accordance with one aspect, the present invention is directed to a vibratory separation system for providing enhanced filtration. The vibratory separation system comprises a membrane module, a drive mechanism, a process fluid inlet, and a permeate outlet. The membrane module includes an axis and a plurality of stacked filter elements and each filter element has an metal membrane support plate and a permeable membrane having an upstream and a downstream surface. The downstream surface of the permeable membrane is mounted to the metal membrane support plate in a first region having a thickness in the range of 0.002 inch to 0.040 inch. The process fluid inlet communicates with the upstream surface of each permeable membrane to supply a process fluid to the vibratory separation system. A permeate outlet communicates with the downstream surface of each permeable membrane. The drive mechanism is coupled to the membrane module for imparting vibratory motion to the membrane module. The direction of vibration is in a plane perpendicular to the axis of the membrane module.

In accordance with another aspect of the present invention, the vibratory separation system comprises a membrane module, a drive mechanism, a process fluid inlet, and a permeate outlet. The membrane module includes an axis and a plurality of filter elements. Each filter element including a membrane support plate having an outer peripheral region and at least one permeable membrane having an upstream surface and a downstream surface. The downstream surface of the permeable membrane is mounted to the membrane support plate. The membrane module also includes a process fluid chamber which communicates with the upstream surface of each permeable membrane. The plurality of filter elements are secured to each other such that the outer peripheral regions are laminated and define a contaminant wall isolating the process fluid on one side of the wall. The process fluid inlet communicates with each process fluid chamber, and the permeate outlet communicates with each permeate chamber. The drive mechanism is coupled to the membrane module for imparting vibratory motion thereto. The direction of vibration is in a plane perpendicular to the axis of the membrane module.

In accordance with another aspect of the present invention, the vibratory separation system comprises a generally cylindrical membrane module, a vibratory drive mechanism, a process fluid inlet, and a permeate outlet. The generally cylindrical membrane module including a plurality of thin metal membrane support plates and a plurality of permeable membranes. Each thin metal membrane support plate has, an inner peripheral region, an outer peripheral region, and an intermediate region. Each permeable membrane includes an upstream and downstream surface. The downstream surface of each permeable membrane is mounted to the intermediate region of the thin metal membrane support plates. The plurality of thin metal membrane support plates being secured to one another by laminating the outer peripheral regions to define an outer wall and by laminating the inner peripheral regions to define an inner wall. The process fluid inlet communicates with the upstream surfaces of the permeable membranes, and the permeate outlet communicates with the downstream surfaces of the permeable membranes. The drive mechanism is coupled to the membrane module for imparting vibratory motion thereto.

In accordance with another aspect, the present invention is directed to a membrane separation unit for use with a vibratory drive mechanism which imparts vibratory motion to the membrane separation unit in a plane perpendicular to an axis of the membrane separation unit. The membrane separation unit comprises a membrane module, a process fluid inlet, a permeate outlet, and a retentate outlet. The membrane module includes a plurality of stacked filter elements. Each filter element includes a permeable membrane having an upstream surface and a downstream surface and an metal membrane support plate. The downstream surface of the permeable membrane is mounted to the support plate in a first region where the metal membrane support plate has a thickness in the range from about 0.002 inch to about 0.04 inch. The process fluid inlet, the permeate outlet and the retentate outlet are coupled to the membrane module. The process fluid inlet communicates with the upstream surface of the permeable membranes for facilitating the introduction of process fluid to the membrane module. The permeate outlet communicates with the downstream surface of the permeable membranes for facilitating the removal of permeate from the membrane module. The retentate outlet communicates with the upstream surface of the permeable membranes and facilitates the removal of retentate from the membrane module.

In accordance with another aspect of the present invention, the membrane separation unit comprises a membrane module, a process fluid inlet, a permeate outlet, and a retentate outlet. The membrane module includes a plurality of filter elements. Each filter element includes a thin metal membrane support plate having an outer peripheral region, and at least one permeable membrane having an upstream surface and a downstream surface. The downstream surface of the permeable membrane is mounted to the membrane support plate. The membrane module also includes a process fluid chamber communicating with the upstream surface of each permeable membrane.

The filter elements are secured to each other such that the outer peripheral regions are laminated and define a containment wall isolating the process fluid on one side of the wall. The process fluid inlet, the permeate outlet and the retentate outlet are coupled to the membrane module. The process fluid inlet communicates with each process fluid chamber for facilitating the introduction of process fluid to the membrane module. The permeate outlet communicates with each permeate chamber for facilitating the removal of permeate from the membrane module. The retentate outlet communicates with each process fluid chamber and facilitates the removal of retentate from the membrane module.

In accordance with another aspect of the present invention, the membrane separation unit comprises a generally cylindrical membrane module, a process fluid inlet, a permeate outlet, and a retentate outlet. The generally cylindrical membrane module includes a plurality of thin metal membrane support plates and a plurality of permeable membranes. Each thin metal membrane support plate has an inner peripheral region, an outer peripheral region, and a region intermediate the inner and outer peripheral regions.

Each of the permeable membranes includes an upstream surface and a downstream surface. The downstream surface of the permeable membranes are mounted to the intermediate region of each of the thin metal membrane support plates. The plurality of thin metal membrane support plates are secured by laminating the outer peripheral regions to define an outer wall and by laminating the inner peripheral regions to define an inner wall. The process fluid inlet, the permeate outlet and the retentate outlet are coupled to the membrane module. The process fluid inlet communicates with the upstream surface of the permeable membranes for facilitating the introduction of process fluid to the membrane module. The permeate outlet communicates with the downstream surface of the permeable membranes for facilitating the removal of permeate from the membrane module. The retentate outlet communicates with the upstream surface of the permeable membranes and facilitates the removal of retentate from the membrane module.

In accordance with another aspect of the present invention, the membrane separation unit comprises a membrane module, a process fluid inlet, a permeate outlet, and a retentate outlet. The membrane module includes a plurality of stacked filter elements, a head plate assembly having a substantially concave lower surface, and a base plate assembly having a substantially convex upper surface. Each filter element includes a permeable membrane having an upstream surface and a downstream surface and a membrane support plate. The downstream surface of the permeable membranes are mounted to the membrane support plates. The stacked filter elements are mounted between the head plate assembly and the base plate assembly thereby configuring the membrane support plates into a substantially conical configuration. The process fluid inlet, the permeate outlet and the retentate outlet are coupled to the membrane module. The process fluid inlet communicates with the upstream surface of the permeable membranes. The permeate outlet communicates with the downstream surface of the permeable membranes for facilitating the removal of permeate from the membrane module. The retentate outlet communicates with the upstream surface of the permeable membranes and facilitates the removal of retentate from the membrane module.

In accordance with another aspect of the present invention, the membrane separation unit comprises a membrane module, a process fluid inlet, a permeate outlet, and a retentate outlet. The membrane module includes a plurality of stacked filter elements. Each filter element includes a permeable membrane having an upstream surface and a downstream surface and a membrane support plate. The downstream side of the permeable membranes are mounted to the membrane support plates in a first region having a thickness in the range from about 0.002 inch to about 0.04 inch. The filter elements are secured to each other such that open channels are formed between the permeable membranes. The open channels are substantially free of structure. The membrane module has a filter surface area to volume ratio of at least about 3 $ft^2/ft^3$. The process fluid inlet, the permeate outlet and the retentate outlet are coupled to the membrane module. The process fluid inlet communicates with the open channels for facilitating the introduction of process fluid to the membrane module. The permeate outlet communicates with the permeate chamber for facilitating the removal of permeate from the membrane module. The retentate outlet communicates with the open channels and facilitates the removal of retentate from the membrane module.

The vibratory motion imparted to the membrane module generates dynamic flow, conditions which tend to prevent the deposition of fluid components such as particulate or colloidal matter on the upstream surface of the permeable membranes. Therefore, clogging or fouling of the permeable membranes is substantially reduced, and the removal of permeate is not impeded.

The dynamic flow conditions are generated by the movement of the filter elements relative to the process fluid. The drive mechanism imparts a vibratory motion to the membrane module; accordingly, the filter elements also vibrate at essentially the same frequency. However, the process fluid does not exhibit vibratory motion at the same frequency as that of the filter elements. Therefore, there is relative motion between the process fluid and the filter elements causing the dynamic flow conditions which inhibit fouling of the filter elements.

The vibratory separation system of the present invention provides for enhanced fluid filtration through improved permeate flow rate. Enhanced filtration is achieved, for example, by reducing the amount of particulate and/or colloidal matter contained within the process fluid from being deposited on the membrane medium of the filter elements. Accordingly, fouling and/or clogging of the membrane medium is greatly reduced, thereby allowing for improved permeate flow rate. Additionally, the useful life of the filter elements is increased thereby, and longer intervals between cleaning and replacement is achieved.

The vibratory separation system of the present invention provides for the effective and highly efficient filtration of fluids. The drive mechanism which is capable of inducing a vibrational force on the membrane module of very high magnitude may be a simple motor arrangement which requires less energy to operate than standard drives utilized in rotational dynamic filtration systems. Accordingly, increased yield is recognized at a reduced cost.

The vibratory separation system of the present invention is energy efficient. In the vibratory separation system of the present invention only the process fluid in the boundary layer may move, rather than all the fluid as in a conventional rotational dynamic filter system. Accordingly, regardless of how thick or viscous the particular fluid is, the energy requirements in the vibratory system are substantially the same. Consequently, the vibratory separation system of the present invention is equally efficient for all fluids, and particularly well suited for making fluids thicker, i.e., an effective and efficient concentrator.

In utilizing the extremely thin metal membrane support plates, a membrane module having increased permeable membrane surface area per given volume may be realized. The thin metal membrane support plates allow for additional filter elements to be placed in a membrane module of given size and weight constraints. In any vibratory filtration system, weight may be a critical factor. Reduced weight means less energy required for movement. Accordingly, a membrane module having increased surface area and minimal weight increase means higher efficiency and a more cost effective filtration system. Although weight may be an important factor, metal support plates are utilized because high strength material is necessary when high magnitude vibrational forces are generated in the membrane module.

The vibratory separation system of the present invention may be easily and efficiently cleaned by simply passing cleaning fluids, such as steam or caustic liquids, through the various inlets and outlets of the system. The exemplary vibratory separation system may be easily and efficiently cleaned because the system is substantially free of cracks, crevices, stagnant regions and other similar structures which may trap contaminants. For example, the vibratory separation system comprises gaskets which protrude into the surrounding surfaces instead of O-rings. The vibratory separation system may also be easily tested. Specifically, the vibratory separation system is integrity testable, e.g., using titre reduction data or water flow data, without destroying the system. In other words, the customer may test the integrity of the system he or she has purchased, effectively clean it, and then use it for its intended purpose.

DETAILED DESCRIPTION OF THE PREFERRED EMBODIMENTS

Figure 1:
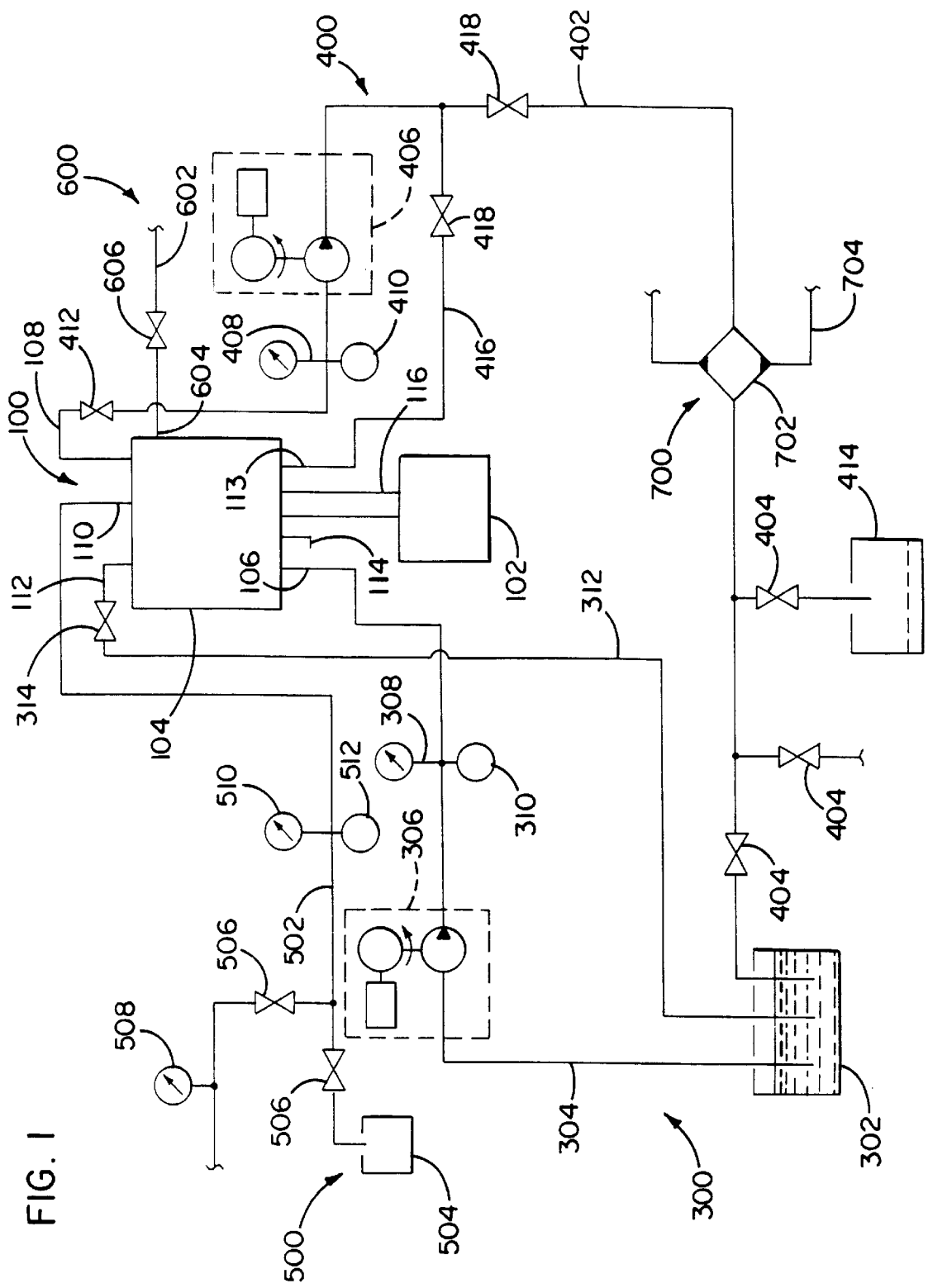
FIG. 1 is a block diagram representation of a vibratory separation system of the present invention.

As illustrated in FIG. 1, an exemplary embodiment of the vibratory separation system of the present invention may include a vibratory separation assembly 100, a process fluid feed arrangement 300, a retentate recovery arrangement 400, and a permeate recovery arrangement 500. The vibratory separation assembly 100 generally comprises a drive mechanism 102 and a membrane module 104 having at least one process fluid inlet 106, a retentate outlet 108, a permeate outlet 110, a process fluid outlet 112, a retentate inlet 113, and a permeate drain 114. The membrane module 104 also includes one or more filter elements, not illustrated in FIG. 1.

The process fluid feed arrangement 300 is connected to the process fluid inlets 106 of the vibratory separation assembly 100 and may include a tank, vat, reservoir, or other container 302 of process fluid which is coupled to the process fluid inlets 106 via a feed line 304. The process fluid feed arrangement 300 may also include a pump assembly 306, which can comprise a positive displacement pump, in the feed line 304 for transporting the process fluid from the container 302 to the vibratory separation assembly 100. A pressure sensor 308 and a temperature sensor 310 coupled to the feed line 304 may also be included in the process fluid feed arrangement 300. Alternatively, the process fluid may be supplied from any suitable pressurized source and the process fluid feed arrangement 300 may include, in addition to or instead of the pump assembly 306, one or more control valves and/or flow meters for controlling the flow of process fluid through the feed line 304 to the process fluid inlets 106 of the vibratory separation assembly 100.

The process fluid feed arrangement 300 may include a process fluid recirculation loop. For example, the process fluid recirculation loop may comprise a process fluid return line 312 coupled between the process fluid outlet 112 and the process fluid container 302. The recirculation loop may also include a valve arrangement 314 and/or a pump assembly (not illustrated). Instead of recirculating the process fluid between the vibratory separation assembly 100 and the container 302, the process fluid recirculation loop may connect the process fluid outlet 112 more directly to the process fluid inlets 106 via lines and a pump assembly (not illustrated). The function of the process fluid recirculation loop is explained in detail subsequently.

The retentate recovery arrangement 400 is coupled to the retentate outlet 108 of the vibratory separation assembly 100. Where the vibratory separation system is a recirculating system designed to repeatedly pass the process fluid across the filter elements of the membrane module 104, the retentate recovery arrangement 400 may include a retentate return line 402 which extends from the retentate outlet 108 to the process fluid container 302. Where the vibratory separation system is designed to pass the process fluid only once across the filter elements of the membrane module 104, the vibratory separation assembly 100, one or more valves 404 may be coupled to the retentate return line 402 to direct the retentate to a separate retentate container or reservoir 414, or away from the vibratory separation system. The retentate recovery arrangement 400 may also include a pump assembly 406, which can include a positive displacement pump, for transporting the retentate from the vibratory separation assembly 100 to the process fluid container 302. Alternatively, the retentate recovery arrangement 400 may include, in addition to or instead of the pump assembly 406, one or more control valves and flow meters coupled to the retentate return line 402 for transporting the retentate fluid from the vibratory separation assembly 100 to the process fluid container 302. A pressure sensor 408 and a temperature sensor 410 coupled to the retentate return line 402 may also be included in the retentate recovery arrangement 400. A valve 412 coupled to the retentate return line 402 may also be included in the retentate recovery arrangement 400 to control the flow rate of retentate exiting the membrane module 104.

The retentate recovery arrangement 400 may also include a retentate recirculation loop. For example, the retentate recirculation loop may comprise a retentate recirculation line 416 coupled between the retentate inlet 113 and the retentate return line 402 downstream from the pump assembly 400. The retentate recirculation loop may also include a valve arrangement 418 for controlling flow between the retentate recirculation line 416 and the retentate return line 402. Instead of recirculating the retentate directly between the retentate outlet 108 and the retentate inlet 113, the retentate recirculation loop may connect the retentate outlet 108 to the retentate inlet 113 less directly through the retentate reservoir 414 or the process fluid container 302 via lines and pump assembly (not illustrated). The function of the retentate recirculation loop is explained in detail subsequently.

The permeate recovery arrangement 500 is coupled to the permeate outlet 110 of the vibratory separation assembly 100 and may include a permeate recovery line 502 which extends from the permeate outlet 110 to a permeate container 504. One or more valves 506 may be coupled to the permeate recovery line 502 to direct the permeate away from the vibratory separation system. Further, pressure sensors 508, 510 and a temperature sensor 512 coupled to the permeate recovery line 502 may also be included in the permeate recovery arrangement 500. Alternatively, the permeate recovery arrangement 500 may include a pump assembly coupled to the permeate recovery line 502 for withdrawing permeate from the vibratory separation assembly 100.

The vibratory separation system may include various other subsystems such as a sterilization and/or cleaning arrangement 600, a heat exchange arrangement 700, and a transport apparatus (not illustrated). The sterilization and/or cleaning arrangement 600 may include a line 602 coupled to an inlet 604 for directing a cleaning fluid such as steam into the vibratory separation assembly 100 through a valve 606. Steam may be directed through the steam line 602 into the vibratory separation assembly 100 and out through the process fluid inlets 106 and outlet 112, the retentate outlet 108 and inlet 113, and/or the permeate outlet 110 to clean and sterilize the vibratory separation assembly 100. Alternatively or in addition, a separate cleaning solution, such as a caustic solution, may be introduced into the vibratory separation assembly 100 through, e.g., the cleaning inlet 604 or the process fluid inlets 106, exiting through, e.g., both the retentate outlet 108 and the permeate outlet 110.

The heat exchange arrangement 700 may be coupled to any or all of the membrane module 104, the process fluid feed line 304, the retentate return line 402, and the permeate recovery line 502 to maintain the temperature of the process fluid, the retentate, or the permeate within a predetermined range. For example. the heat exchange arrangement 700 may include a heat exchanger 702 mounted to the retentate recovery line 402 and supplied with a coolant through a coolant line 704 for maintaining the temperature of the retentate within the predetermined range.

The transport apparatus, not illustrated, may comprise a skid or a cart on which some or all of the components of the vibratory separation system are mounted to facilitate transport of the system.

The vibratory separation assembly 100, as stated above, preferably comprises generally two components: the membrane module 104 and the drive mechanism 102. The membrane module 104 may be connected to a torsion spring 116 of the drive mechanism 102 or any other means suitable for the transmission of vibratory forces.

Figure 2:
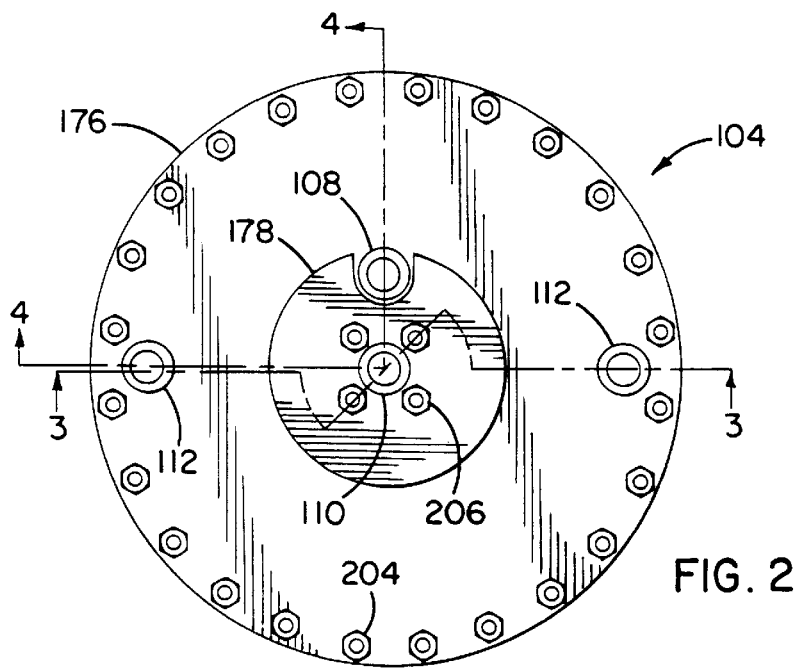
FIG. 2 is a top plan view of a vibratory separation assembly of the vibratory separation system of the present invention.
Figure 3:
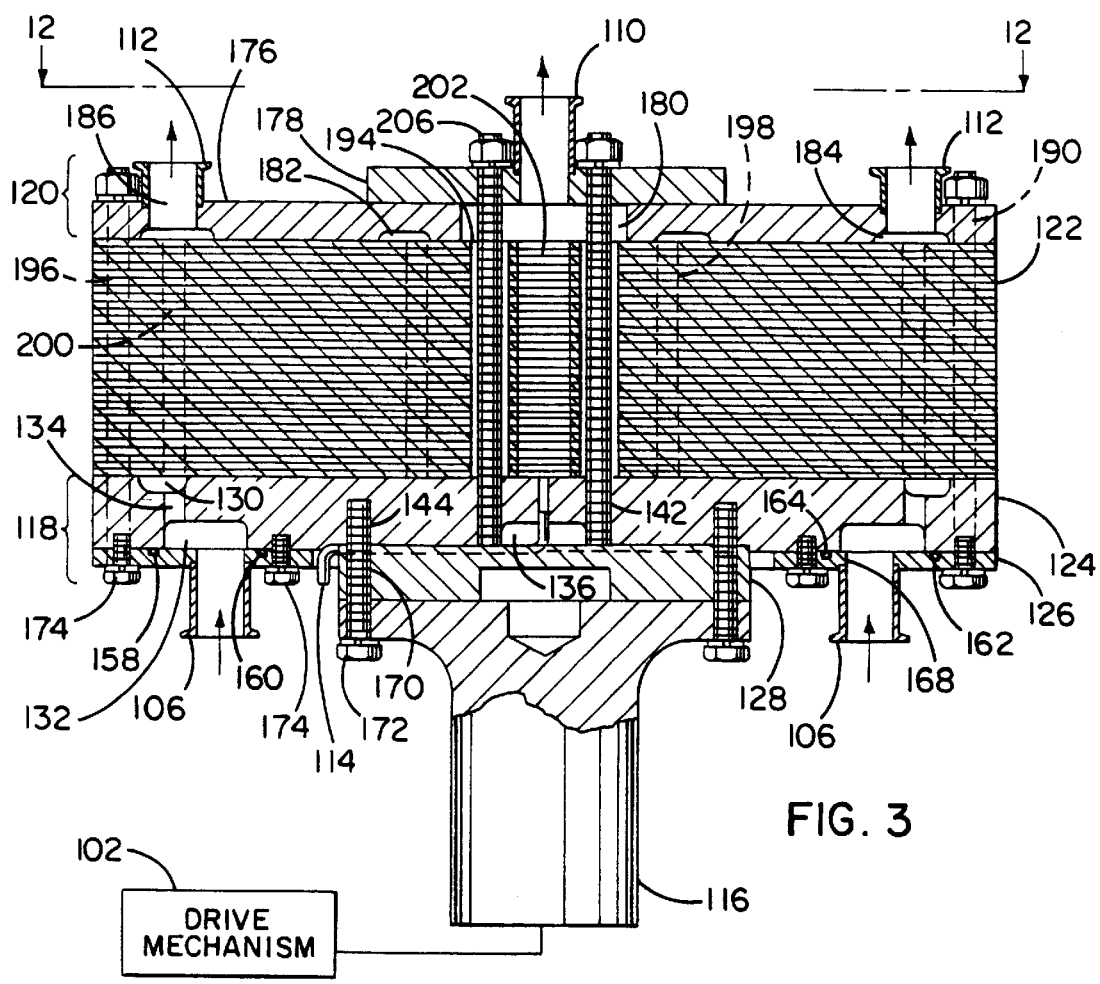
FIG. 3 is an elevation view in partial cross-section of the vibratory separation assembly taken along section line 3—3 in FIG. 2.
Figure 4:
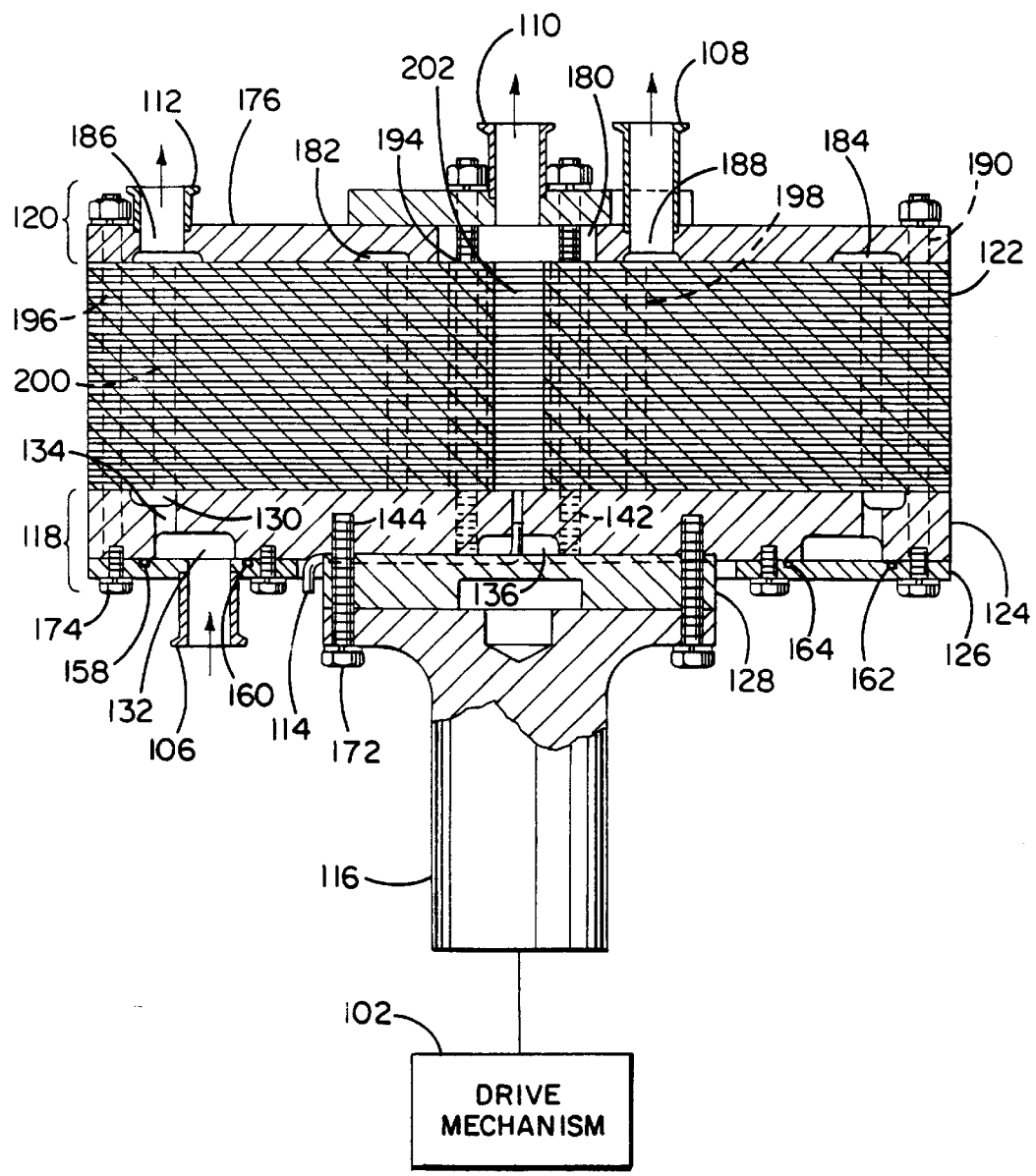
FIG. 4 is an elevation view in partial cross-section of the vibratory separation assembly taken along section line 4—4 in FIG. 2.

The membrane module 104 may comprise various geometries, e.g., a parallel piped configuration, but is preferably constructed utilizing a substantially cylindrical configuration as illustrated in FIGS. 2–4. The membrane module 104 comprises a base plate assembly 118, a head plate assembly 120, and a plurality of filter elements 122 positioned and secured between the base plate assembly 118 and the head plate assembly 120. The process fluid inlets 106, the retentate inlet 113 (illustrated in FIG. 24), and is the permeate drain 114 may be mounted to the base plate assembly 118. The retentate outlet 108, the permeate outlet 110, and the process fluid outlet 112 may be mounted to the head plate assembly 120. The number of filter elements 122 comprising the membrane module 104 varies depending upon the particular application for which the vibratory separation assembly 100 is to be used. In the exemplary embodiment, approximately one hundred filter elements 122 are utilized.

The base plate assembly 118 may be constructed as a one piece, unitary structure, or may preferably be constructed from individual components as illustrated in FIGS. 3–11. The three components comprising the base plate assembly 118 of the illustrated embodiment are the base plate 124, the inlet plate 126, and the center plate 128.

Figure 5:
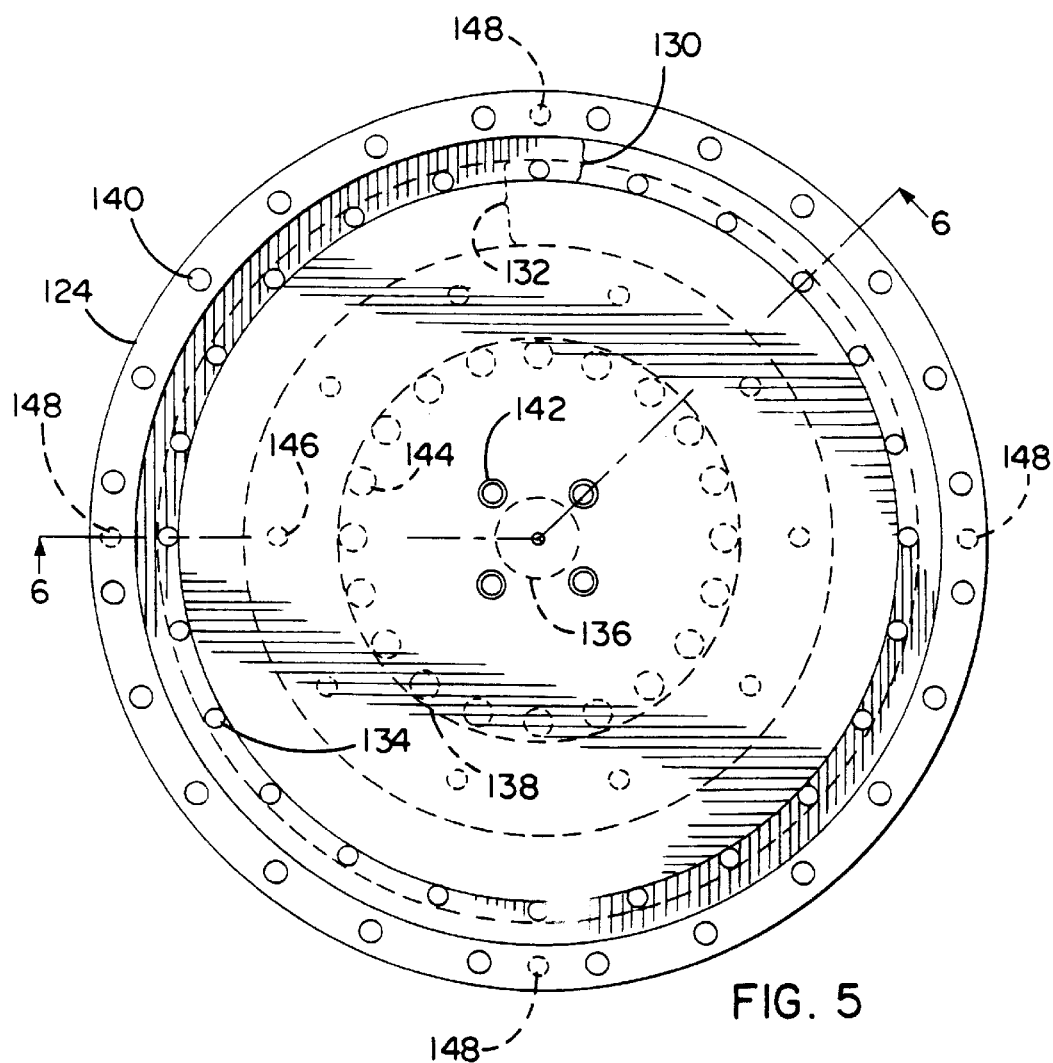
FIG. 5 is a top plan view of a base plate of a base plate assembly of a membrane module of the vibratory separation dynamic filter assembly.
Figure 6:
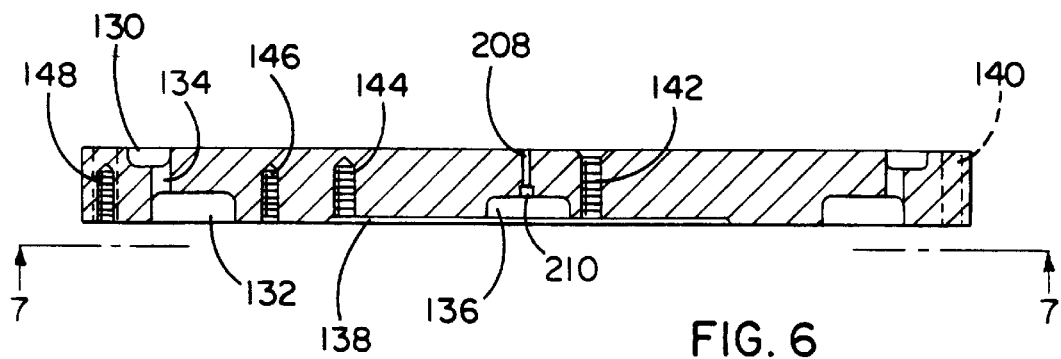
FIG. 6 is a sectional view of the base plate taken along section line 6—6 in FIG. 5.
Figure 7:
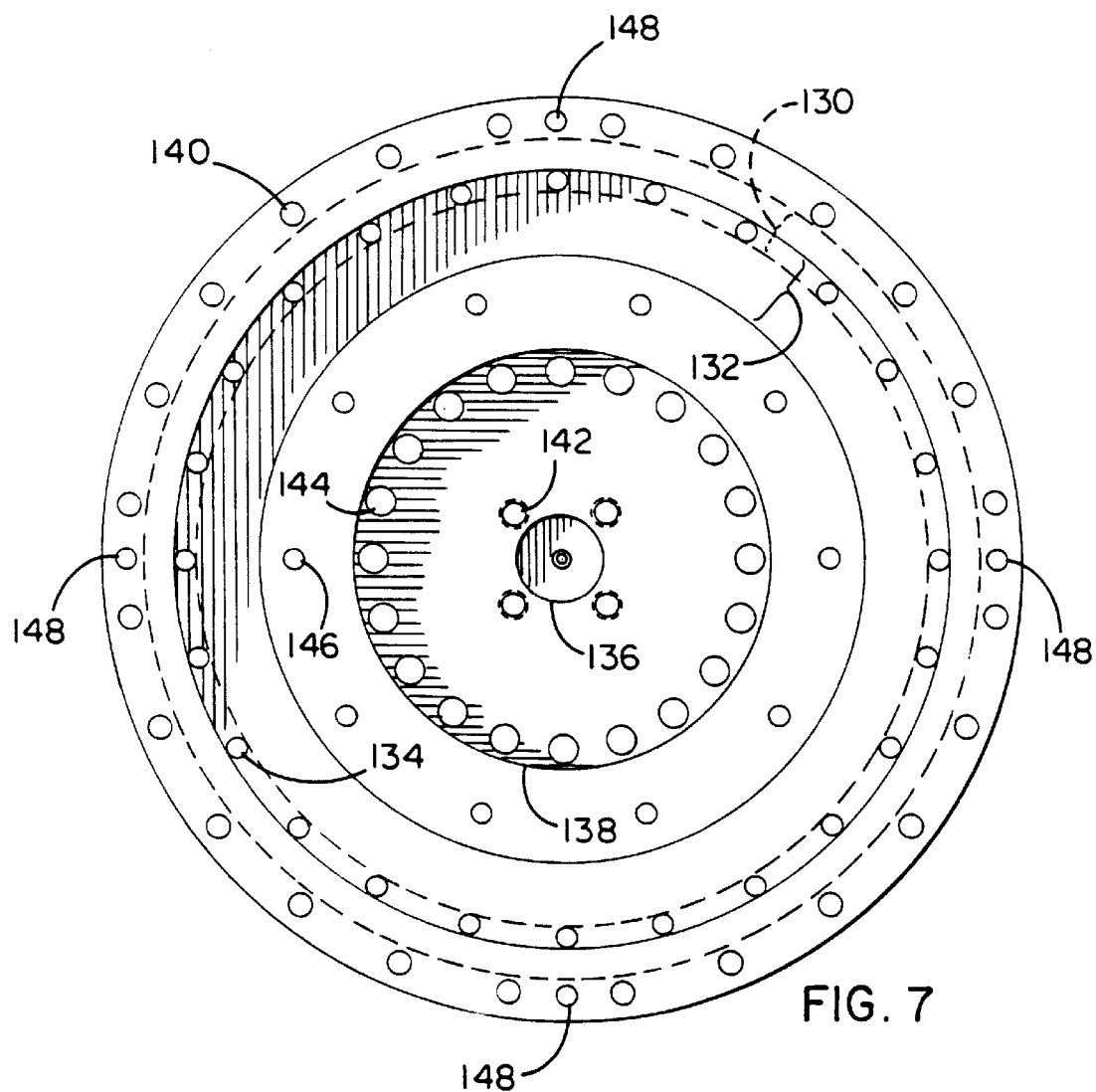
FIG. 7 is a bottom plan view of the base plate of the base plate assembly.
Figure 22:
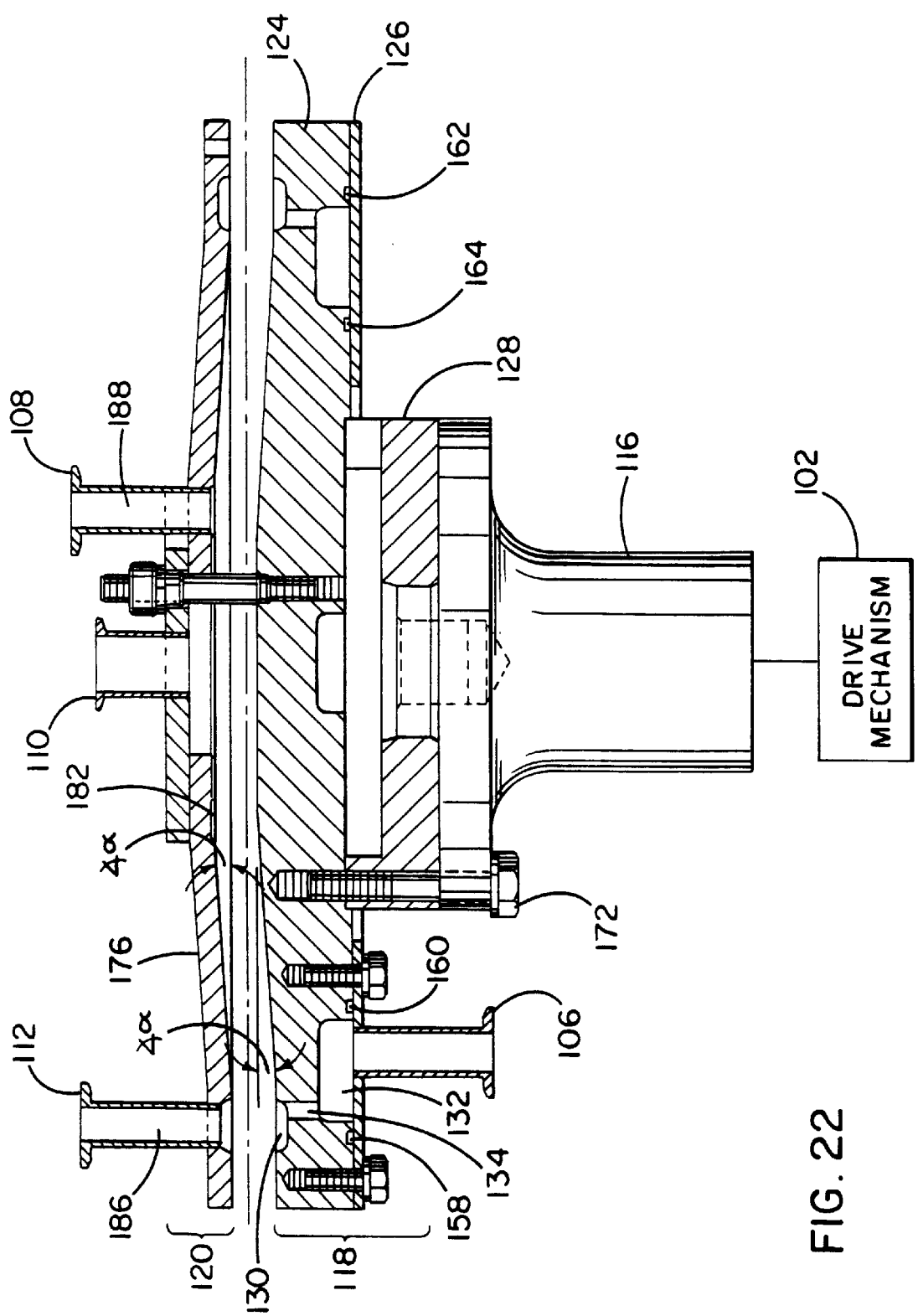
FIG. 22 is a detailed sectional view of the vibratory separation assembly without the filter elements.

As shown in FIGS. 5–7, the base plate 124 may be a substantially cylindrical disc having a lower surface and an upper surface. The lower surface may be substantially flat. The upper surface may also be substantially flat, but it is preferably sloped in at least an intermediate region thereof. For example, the outer periphery and the inner periphery of the upper surface may be substantially flat, and the region between the outer and inner peripheries preferably has a slope which slopes upwardly from a region communicating with the process fluid inlets 106 to a region communicating with the retentate outlet 108. In the illustrated embodiment, the slope extends upwardly from the outer periphery towards the center of the base plate 124. The slope may range from about 0 degrees to about 15 degrees, and preferably the slope may range from about 1 degree to about 8 degrees, and more preferably from about 2 degrees to about 5 degrees. In the preferred embodiment, the slope is about 3 degrees. The sloped region in the base plate 124 is more easily seen in FIG. 22, which is a detailed sectional view of the vibratory separation assembly 100 without the filter elements 122. The slope in the upper surface of the base plate 124 tends to tension and hold the filter elements 122 at an angle comparable to the angle of the base plate 124, and this serves several important functions as is explained in detail subsequently.

The base plate 124 may comprise an upper process fluid channel 130 and a lower process fluid channel 132. In the exemplary embodiment, the upper process fluid channel 130 and the lower process fluid channel 132 are annular grooves, having substantially rectangular cross-sections, in the upper and lower surfaces of the base plate 124, respectively. The upper and lower process fluid channels 130 and 132 are preferably positioned such that there is an overlap between the two channels 130 and 132 and are connected by a plurality of base plate process fluid conduits 134. The process fluid conduits 200 in the filter elements 122 communicate with the upper process fluid channel 130, and the process fluid inlets 106 communicate with the lower process fluid channel 132 as is illustrated in FIGS. 3 and 4.

The base plate 124 may also comprise a central well 136 and a central recess 138. In the exemplary embodiment, the central recess 138 comprises a circular geometry. The center plate 128 may be mounted within the central recess 138 to ensure a non-slip connection of the center plate 128 to the base plate 124. Within the central recess 138 is the central well 136. The central well 136 may be a substantially cylindrical orifice. A permeate drain conduit 208 extends through the center of the base plate 124. The permeate drain conduit 208 may be a narrow tube which connects the permeate conduit 202 in the filter elements 122 to the central well 136 by means of a coupling 210. The permeate drain 114 extends into the central well 136 and connects to the permeate drain conduit 208.

The base plate 124 includes a plurality of holes 140, which may be threaded, circularly arranged around the outer periphery thereof. These holes 140 are utilized to position bolts or other securing means which are used to position and secure the filter elements 122 between the head plate assembly 120 and the base plate assembly 118. In a preferred embodiment, the holes 140 are not threaded. The base plate 124 further includes a plurality of holes 142, which may be threaded, circularly arranged around an inner portion thereof. Two of the holes 142 are illustrated in FIGS. 3 and 4. These holes 142 are also utilized to position bolts or other securing means which may be utilized to secure the filter elements 122 between the head plate assembly 120 and the base plate assembly 118. In a preferred embodiment, the holes 140 are not threaded. The base plate 124 also includes three sets of threaded bores 144, 146 and 148 circularly arranged at different radial distances in the lower surface thereof. The innermost set of threaded bores 144, two of which are illustrated in FIGS. 3 and 4, are utilized to mount the center plate 128 to the base plate 124, and the two remaining sets of threaded bores 146 and 148, two of each set are illustrated in FIGS. 3 and 4, are utilized to position bolts or other securing means in order to mount the inlet plate 126 to the base plate 124.

Figure 8:
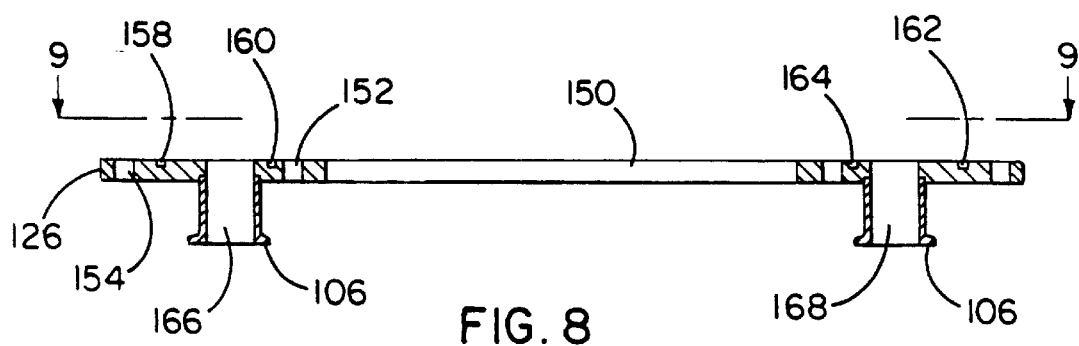
FIG. 8 is a sectional view of an inlet plate of the base plate assembly.
Figure 9:
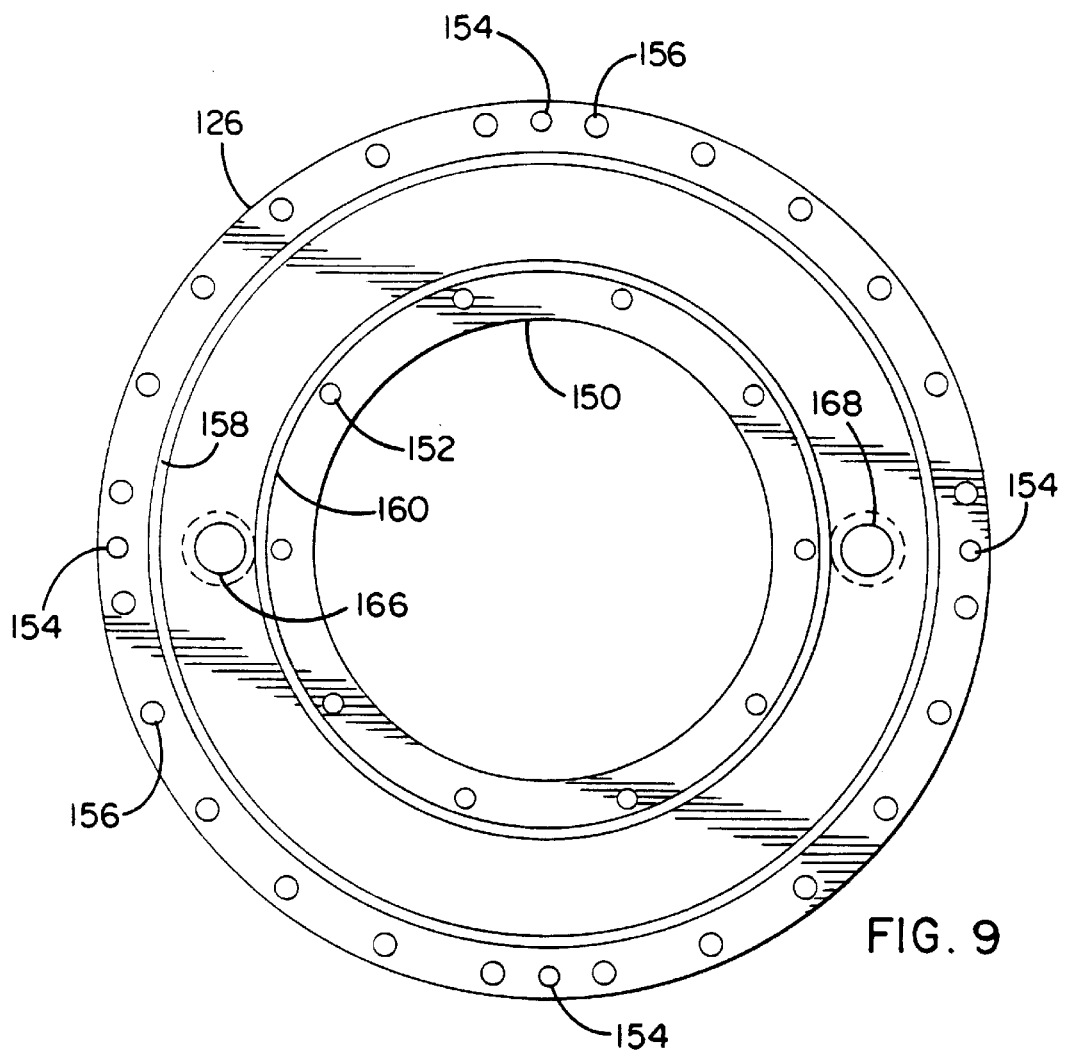
FIG. 9 is a top plan view of the inlet plate of the base plate assembly.

As shown in FIGS. 8 and 9, the inlet plate 126 may comprise an annular disc having an outer diameter which may be substantially equal to the outer diameter of the base plate 124, upper and lower surfaces which may be substantially flat and a central opening 150 which may have a diameter greater than the diameter of the central recess 138 in the base plate 124. The inlet plate 126 also comprises three sets of holes 152, 154, and 156 circularly arranged thereon. The holes 152, 154, 156 may be threaded. Two of the three sets of holes 152 and 154 are arranged so that they are in alignment with the two sets of threaded bores 146 and 148 in the base plate 124, respectively. Two of each set of bores 146 and 148 are illustrated in FIGS. 3 and 4. The third set of holes 156 are arranged so that they are in alignment with the holes 140 in the base plate 124. The inlet plate 126 may also include two sets of annular grooves 15 and 160 in the upper surface thereof. Sealing members 162 and 164, such as gaskets, may be positioned in the grooves 158 and 160 to ensure a fluid tight seal between inlet plate 126 and the base plate 124. The process fluid inlets 106 communicate with openings 166 and 168 in the inlet plate 126. The process fluid inlets 106 may be mounted to the inlet plate 126 by any suitable means including welding, brazing, pressure fitting, or threading.

Figure 10:
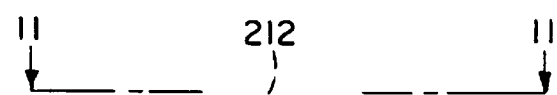
FIG. 10 is a sectional view of a center plate of the base plate assembly.
Figure 11:
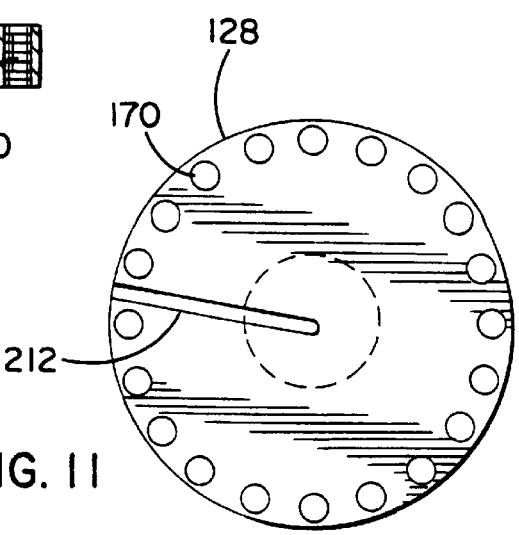
FIG. 11 is a top plan view of the center plate of the base plate assembly.

As shown in FIGS. 10 and 11, the center plate 128 may comprise a substantially cylindrical disc having a diameter substantially equal to the diameter of the central recess 138 in the base plate 124 and upper and lower surfaces which may be substantially flat. The center plate 128 fits snugly into the central recess 138 to prevent movement thereof. The center plate 128 comprises a plurality of holes 170, two of which are illustrated in FIGS. 3 and 4, circularly arranged around its outer periphery. These holes 170 are arranged so that they are in alignment with the innermost set of threaded bores 144 in the base plate 124. In the exemplary embodiment, the center plate 128 is a solid cylindrical disc. A radial groove 212 extends from the center of the center plate 128 to its outer edge. The permeate drain 114 may be positioned within this groove 212, and may be secured within the groove 212 by welding or any other suitable means.

The base plate 124, the inlet plate 126, and the center plate 128 may comprise a metallic material, a polymeric material or any other material having sufficient rigidity to withstand the associated vibrational forces imparted by the drive mechanism 102. In addition to sufficient rigidity, the material utilized preferably should not react with the particular process fluid being filtered. In the preferred embodiment, the base plate 124, the inlet plate 126, and the center plate 128 all comprise stainless steel.

The torsion spring 116 may be connected to the base plate assembly 118 by a plurality of bolts 172, running thread, or other securing means, positioned trough openings in an upper portion of the torsion spring 116. The plurality of bolts 172, two of which are illustrated in FIGS. 3 and 4, may extend through the torsion spring 116 and through the plurality of holes 170 in the center plate 128 and may be tightened into the threaded bores 144 in the base plate 124. Accordingly, the torsion spring 116 and the center plate 128 may be mounted to the base plate 124 in a single step. The positioning of the center plate 128 in the central recess 138 provides for a secure, non-slip connection. Slippage may result in damage to the vibratory separation assembly 100. The inlet plate 126 may be mounted to the base plate 124 by a plurality of bolts 174, running thread, or other securing means. The bolts 174, four of which are illustrated in FIGS. 3 and 4, are positioned through the two sets of holes 152 and 154 in the inlet plate 126, and tightened into the two sets of threaded bores 146 and 148 in the base plate 124.

The head plate assembly 120 may be constructed as a one-piece, unitary structure, or may preferably be constructed from individual components as illustrated in FIGS. 3, 4 and 12–16. In the illustrated embodiment, the two components comprising the head plate assembly 120 are the head plate 176 and the head plate cover 178.

Figure 12:
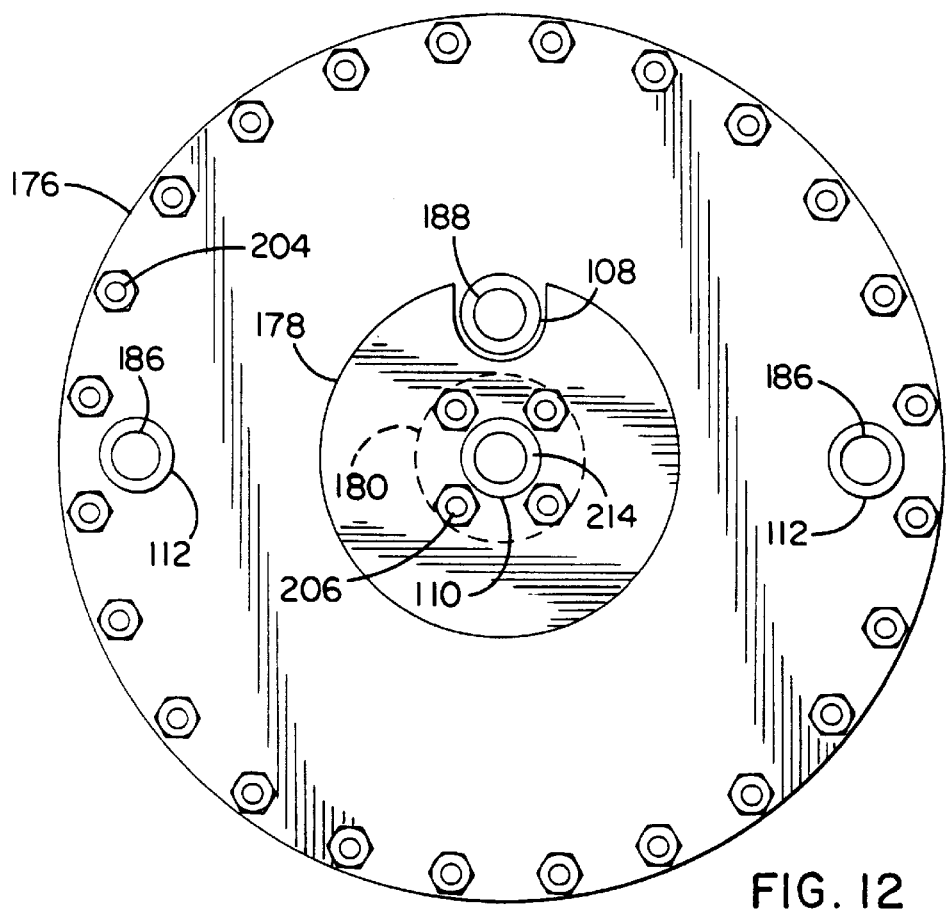
FIG. 12 is a top plan view of a head plate assembly of the membrane module of the vibratory separation assembly.
Figure 13:
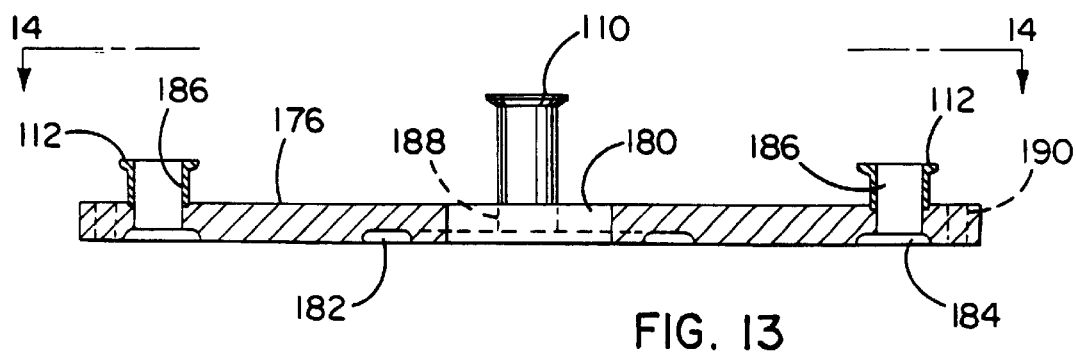
FIG. 13 is a sectional view of a head plate of the head plate assembly.
Figure 14:
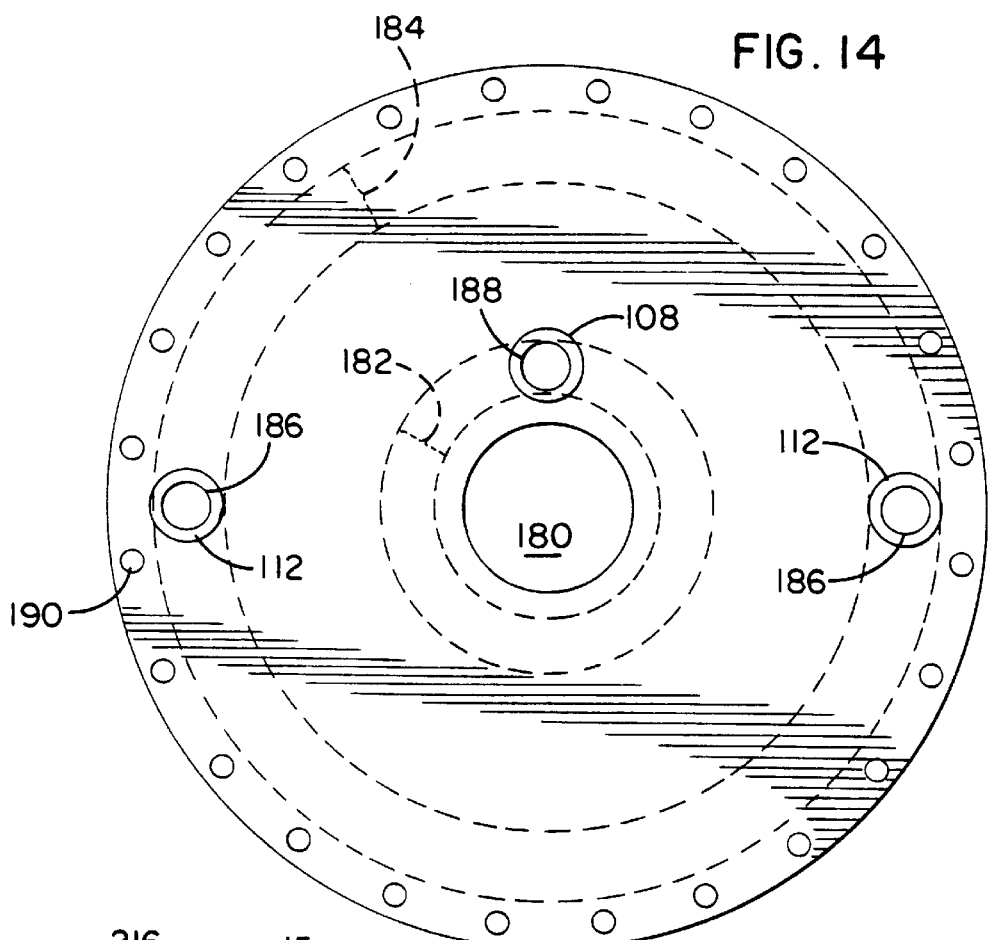
FIG. 14 is a top plan view of the head plate of the head plate assembly.

As shown in FIGS. 12–14, the head plate 176 may be a substantially cylindrical disc having an outer diameter substantially equal to that of the base plate 124, with a substantially flat upper surface. The lower surface may also be substantially flat, but it is preferably sloped at least in an intermediate region thereof. Specifically, the outer periphery and the inner periphery of the lower surface may be substantially flat, and the region between the outer and inner peripheries preferably has a slope which slopes upwardly from a region communicating with the process fluid inlets 106 to a region communicating with the retentate outlet 108.

In the illustrated embodiment, the slope extends upwardly from the outer periphery towards the center of the head plate 176. The slope may range from about 0 degrees to about 15 degrees, and preferably the slope may range from about 1 degree to about 8 degrees, and more preferably from about 2 degrees to about 5 degrees. In the preferred embodiment the slope is about 3 degrees. The sloped region in the head plate 176 is more easily seen in FIG. 22, which, as stated above, is a detailed sectional view of the vibratory separation assembly 100 without the filter elements 122. The slope in the lower surface of the head plate 176 is comparable to, e.g., equal to the slope in the upper surface of the base plate 124, the base plate 124 being convex and the head plate 176 being concave. The slope in the lower surface of the head plate 176 also tends to tension and hold the filter elements 122 at an angle comparable to the angle of the head plate 176 which serves several important functions as is explained in detail subsequently.

The head plate 176 preferably comprises a central opening 180 with which the permeate outlet 110 communicates, a retentate outlet channel 182 in the lower surface thereof, a process fluid outlet channel 184 in the lower surface thereof, process fluid outlet conduits 186 which connect the process fluid outlet channel 184 to the process fluid outlets 112, and a retentate outlet conduit 188 which connects the retentate outlet channel 182 to the retentate outlet 108. The process fluid outlets 112 communicate with the process fluid outlet conduits 186 of the head plate 176, and the retentate outlet 108 communicates with the retentate outlet conduit 188 in the head plate 176. The process fluid outlet 112, the retentate outlet 108, and the permeate outlet 110 may be mounted to the head plate 176 by any suitable means such as welding, brazing, pressure fitting, or threading. The process fluid outlets 112 may be utilized to remove excess process fluid, or to recirculate the process fluid back to the process fluid inlets 106 in order to provide uniform fluid flow parameters to all of the filter elements 122. A complete description of this process is given in detail subsequently. The head plate 176 also includes a plurality of holes 190 circularly arranged around its outer periphery. These holes 190, two of which are illustrated in FIGS. 3 and 4, are arranged such that they are in alignment with holes 140 in the base plate 124.

Figure 16:
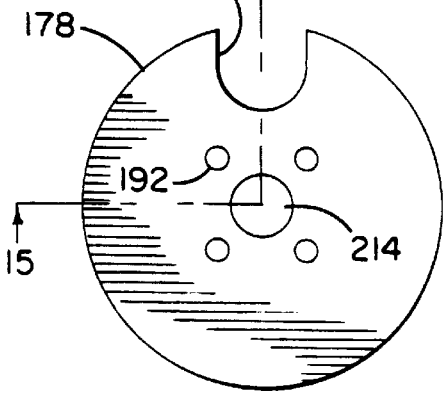
FIG. 16 is a plan view of the head plate cover of the head plate assembly.
Figure 15:
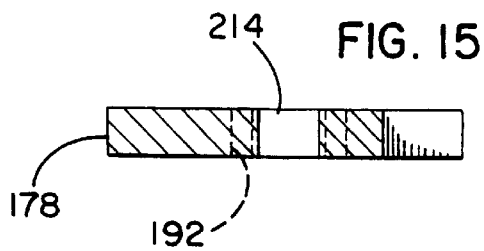
FIG. 15 is a sectional view of a head plate cover of the head plate assembly.

As shown in FIGS. 15 and 16, the head plate cover 178 may be a substantially cylindrical disc having substantially flat upper and lower surfaces. The head plate cover 178 preferably has a diameter larger than the central opening 180 of the head plate 176 but substantially less than the diameter of the head plate 136. The head plate cover 178 comprises a plurality of holes 192 circularly arranged around a central region thereof. The holes 192, two of which are illustrated in FIGS. 3 and 4, are arranged such that they are in alignment with the plurality of holes 142 in the base plate 124. The head plate cover 178 also comprises a central opening 214 through which the permeate outlet 110 is mounted as illustrated in FIGS. 3 and 4. The head plate cover 178 also comprises a u-shaped notch 216 through which the retentate outlet 108 is positioned.

The head plate 176 and the head plate cover 178 may comprise a metallic material, a polymeric material, or any other material having sufficient rigidity to withstand the associated vibrational forces imparted by the drive mechanism 102. In addition to sufficient rigidity, the material utilized preferably should not react with the particular process fluid. In the preferred embodiment, the head plate 176 and the head plate cover 178 comprise stainless steel.

The plurality of filter elements 122 are positioned and secured between the base plate assembly 118 and the head plate assembly 120. Although the filter elements 122 may be configured in a wide variety of ways, each filter element 122 preferably comprises a membrane support plate 218 and a permeable membrane 262, as is illustrated in FIGS. 17 through 21. The membrane support plate 218 may comprise a substantially circular disc having a central opening 220, and three sets of circularly arranged holes 230, 234, and 236. The central opening 220 of each of the filter elements 122 and the outermost set of circularly arranged holes 234 in the filter elements 122 form guides 194 and 196 for the bolts or other fastening means which are utilized to secure the head plate assembly 120 to the base plate assembly 118 when the filter elements 122 are positioned therebetween. The central guide 194 is a single opening in which all the bolts are positioned. The outer guides 196, two of which are illustrated in FIGS. 3 and 4, each contain a single bolt.

With the filter elements 122 secured in position between the base plate assembly 118 and the head plate assembly 120, the remaining two sets of circularly arranged holes 230 and 236 align to form conduits. The innermost set of circularly arranged holes 230 form a plurality of retentate conduits 198, one of which is illustrated in FIG. 4, which communicate with the retentate outlet 108 via the retentate outlet channel 182 in the lower surface of the head plate 176. The intermediate set of circularly arranged holes 236 form a plurality of process fluid conduits 200 which communicate at a first end with the process fluid inlets 106 via the pair of process fluid channels 130 and 132 in the base plate 124, and at a second end with the process fluid outlets 112 via the process fluid outlet channel 184 in the lower surface of the head plate 176. In addition, the central openings 220 in each of the filter elements 122 also form a conduit, specifically, a permeate conduit 202. The permeate conduit 202 communicates at a first end with the permeate outlet 110 through the central opening 180 in the head plate 176, and at a second end with the permeate drain 114. Since the central openings 220 are larger to accommodate the bolts or other fastening means as well as form the permeate conduit 202, a plug or any other suitable means may be utilized to reduce the permeate hold-up substantially reducing the volume formed by the central openings 220.

The head plate assembly 120 may be attached to the base plate assembly 118 by the two sets of bolts 204 and 206 or other securing means such as running thread or tie rods. The first set of bolts 204, two of which are illustrated in FIGS. 3 and 4, extend through the holes 190 in the head plate 176, through the guides 196 in the filter elements 122 and into the holes 140 in the base plate 124. The second set of bolts 206, two of which are illustrated in FIGS. 3 and 4, extend through the holes 192 in the head plate cover 178, through the central opening 180 in the head plate 176, through the central guide 194 in the filter elements 122 and into holes 142 in the base plate 124.

The drive mechanism 102 transfers vibratory forces, for example, in the form of orbital, oscillational, torsional, or linear vibratory motion, to the membrane module 104 to induce motion between the process fluid and the surface of each permeable membrane 262. Preferably, the direction of vibration is in a plane perpendicular to the axis of the membrane module 104. In an exemplary embodiment, the drive mechanism 102 may be an eccentric drive mechanism which comprises a motor, an output shaft, an eccentric weight, a base weight, a torsional element, and a support structure. A drive mechanism 102 in accordance with the illustrated embodiment is described in U.S. Pat. No. 5,114,564 to Culkin, which is incorporated by reference herein. The output shaft is connected to the motor by any suitable means. An AC motor may be utilized to rotate the output shaft because AC motors are more easily and accurately controlled. A motor controller may be utilized to vary the speed of rotation, thereby altering the frequency of the vibratory forces. The eccentric weight having a predetermined mass is connected in proximity to the end of the output shaft opposite to where the shaft is connected to the motor. The base weight, having a predetermined mass is connected to the output shaft at a position below the eccentric weight, in other words, further away from the motor. As the eccentric weight is oscillated by the rotation of the output shaft, it induces a wobble that is transmitted to the base weight, which then oscillates at substantially the same frequency as the induced wobble. Accordingly, the base weight becomes a seismic mass possessing a certain vibratory motion.

The base weight may be supported by the support structure through an isolation means such as a deformable footing made of an elastomeric or resilient material. The isolation means may also include springs to absorb or attenuate some of the energy which may otherwise be transferred to the support structure, thereby preventing movement of the support structure. In addition, the springs tend to center the oscillating masses. The isolation means permits movement of the base weight in the seismic mass mode while minimizing movement of the support structure.

The torsional element, which may be the torsion spring 116 illustrated in FIGS. 3 and 4, is connected to the base weight. The torsion spring 116 may comprise a relatively uniform rod having an enlargement thereupon adjacent to the position where the torsion spring 116 is connected to the base weight. The torsion spring 116 may have a natural frequency and is capable of resonating at substantially the same frequency as the forces generated by the base weight. Therefore, the membrane module 104 which is rigidly attached to the torsion spring 116 will also vibrate at substantially the same frequency as the torsion spring 116. A clamp may be utilized to help support the torsion spring 116. The clamp may be attached, for example, between the support structure and a portion of the torsion spring 116 to support and prevent a wobble from being induced in the torsion spring 116. The clamp may comprise a steel frame having several rotatable rubber bushings compressed against the torsion spring 116. The clamp allows the torsion spring 116 to vibrate torsionally but prevents the torsion spring 116 from developing a wobble.

In the above described eccentric drive mechanism the eccentric mass is positioned above the base mass, certain undesirable loading effects may be transmitted through the base mass to the torsion spring. Accordingly, in an alternative embodiment, the eccentric mass may preferably be positioned in an opening in the base mass such that the eccentric mass and the base mass are in the same plane. Consequently, there are substantially no forces generated above the base mass, but rather the forces are generated through the base mass. In a more preferred embodiment two eccentric masses may be utilized and which are rotated 180 degrees out of phase with respect to one another in order to effectively cancel out any undesirable loading effects. The two eccentric masses may be driven independently by two motors or by a single motor and a gear or drive arrangement which ensures that the rotation will be 180 degrees out of phase.

Additionally in this alternative embodiment of the eccentric drive mechanism, the base mass may comprise a substantially circular configuration, a plurality of holes symmetrically distributed about an inner periphery of the base mass, and semi-circular balancing weights mounted around an outer periphery of the base mass. This embodiment may be utilized to facilitate a more even load distribution in the base mass by redistributing the mass concentration to the outer periphery.

In an alternative embodiment, the drive mechanism 102 may comprise a direct drive apparatus. For example, the membrane module 104 may be linked or coupled to a direct drive motor via a drive shaft or linkage or a drive belt or chain. In this embodiment, the membrane module 104 may be oscillated directly by the motor.

A control system, preferably an automatic control system, may be utilized to control the operation of the drive mechanism 102, e.g., to maintain the parameters of vibration within predetermined limits. Generally, control systems may be characterized as open loop systems or closed loop, i.e., feedback systems. One of the basic design constraints on either type of control system is stability, e.g., fast response and reasonable damping. Although open loop systems generally provide for faster response, closed loop systems provide for more stable control. Accordingly, an open loop control system is much less preferable than a closed loop system for controlling the vibratory separation assembly. An exemplary feedback type controller is disclosed in co-pending provisional patent application No. 60/015,931, assigned to the same assignee as the present invention, and incorporated by reference herein.

Figure 17:
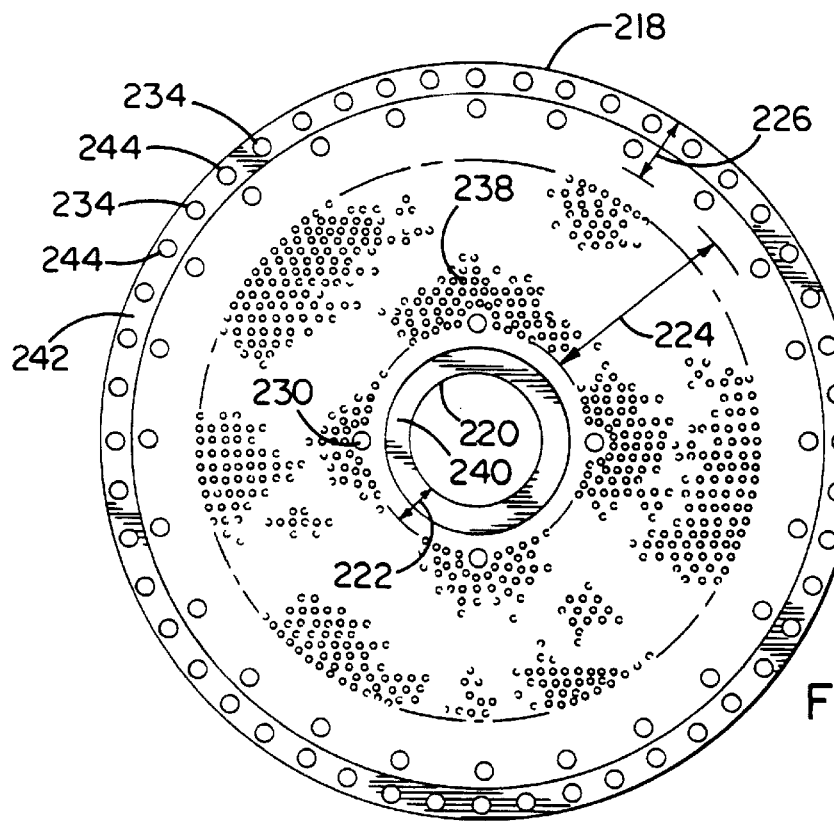
FIG. 17 is a plan view of a process fluid side of a membrane support plate of a filter element of the membrane module.
Figure 18:
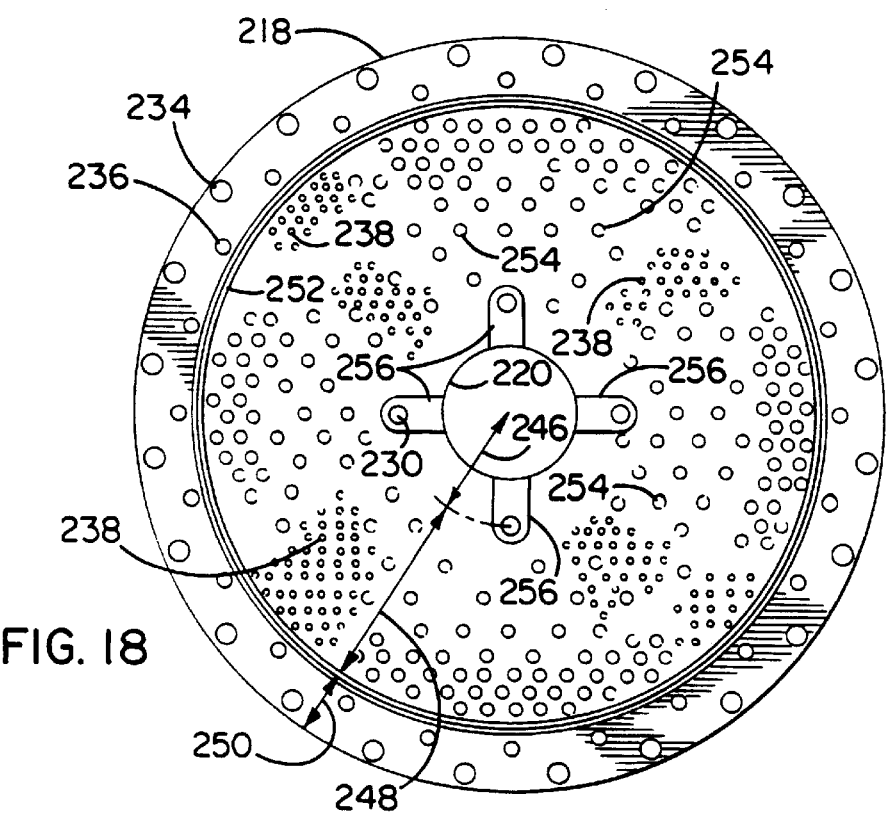
FIG. 18 is a plan view of a permeate fluid side of the thin membrane support plate.
Figure 19:
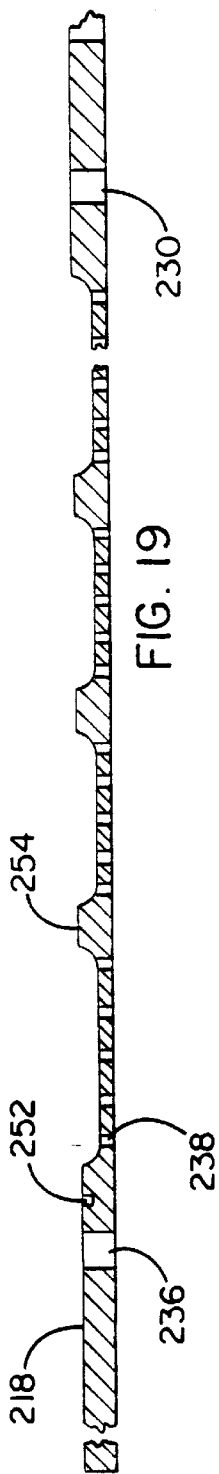
FIG. 19 is a sectional view of a portion of the membrane support plate.

The filter elements 122, as stated above, each may comprise a membrane support plate 218 and a permeable membrane 262. As shown in FIGS. 17–19, the membrane support plate 218 preferably comprises a permeate side and a process fluid side to which the permeable membrane 262 is mounted. The membrane support plate 218 may be constructed from any material having sufficient structural integrity, such as a suitable polymeric material, but is most preferably formed from a metallic material, such as stainless steel. Other metals which may be utilized are aluminum, brass, copper, titanium and bronze. The particular material utilized is preferably strong enough to withstand the vibratory forces generated by the drive mechanism 102 and is compatible with the particular process fluid being filtered.

The diameter of the membrane support plate 218 may vary with the particular application for which it is to be utilized. For example, the diameter may be in the range from about 2 inches to about 50 inches, and preferably from about 10 inches to about 30 inches, and more preferably from about 20 inches to about 25 inches. In the exemplary embodiment, the membrane support plate 218 has a diameter of about 24 inches. In the illustrated embodiment, the central openings 220 of the membrane support plates 218 which form the permeate conduit 202 in the filter elements 122 as well as the central guide 194, may have a diameter in the range from about 0.5 inches to about 10 inches, and more preferably from about 1 to about 5 inches. In the exemplary embodiment, the central opening has a diameter of about 4 inches.

In accordance with one aspect of the present invention, the membrane support plates 218 may be extremely thin. The thickness of the membrane support plate 218, as is explained in detail subsequently, may vary depending upon the region of the membrane support plate 218. In its thinnest part the membrane support plate 218 may have a thickness ranging from 0.002 to 0.040 inches, and preferably from 0.003 to 0.008 inches. In its thickest part, the membrane support plate 218 may have a thickness ranging from 0.004 to 0.100 inches, preferably from about 0.005 to about 0.020 inches, and more preferably from about 0.010 to about 0.015 inches. The thinner the membrane support plate 218, the more filter elements 122 which can be utilized in a given volume, and therefore, more filter surface area per given volume and weight. Increasing the filter surface area to volume ratio enhances throughput and efficiency, and reducing weight for a given filter surface area results in a lower moment of inertia which the drive mechanism 102 needs to overcome; accordingly, smaller and less expensive drive mechanisms 102 may be utilized. Membrane support plates formed from a thin metal are particularly preferred because, although they are thin, they are also very strong and dimensionally stable.

The filter elements 122 may be positioned between the base plate assembly 118 and the head plate assembly 120 to form the membrane module 104 and may be preferably positioned in a pairwise manner. Specifically, every pair of filter elements 122 may be positioned with the permeate sides of the membrane support plates 218 facing each other. Adjacent pairs of filter elements 122 may have the process fluid sides of the membrane support plates 218 facing each other. The reason for this particular arrangement will become apparent from the detailed description of the membrane module 104 and the operation of the vibratory separation assembly 100 given subsequently. In an alternative embodiment, the paired filter elements 122 may be formed into sub-modules comprising, for example, ten filter elements 122 (five pairs). The sub-modules may be formed by thermoplastically sealing the filter elements 122 to one another. Accordingly, groups of the sub-modules may then be positioned between the base plate assembly 118 and the head plate assembly 120 to form the membrane module 104. Consequently, a membrane module 104 may comprise any number of sub-modules which may be rapidly assembled into a membrane module 104 by stacking the sub-modules with a seal disposed between each adjacent pair of submodules.

As shown in FIG. 17, the process fluid side of the membrane support plate 218 may be divided into three annular regions: an inner region 222, an intermediate region 224, and an outer region 226. Within the inner region 222 is the innermost set of circularly arranged holes 230 described previously as forming the retentate conduits 198 in the filter elements 122, as illustrated in FIGS. 3 and 4. In the illustrated embodiments this innermost set of circularly arranged holes 230 comprises four holes; however, more or fewer holes may be utilized, for example, eight holes. These four holes 230 form the retentate conduits 198 when the filter elements 122 are positioned and secured between the head plate assembly 120 and the base plate assembly 118. In the exemplary embodiment the membrane support plate 218 in the inner region 220 is impervious to fluid flow, except obviously for the four retentate holes 230.

Within the outer region 226 are the second and third sets of circularly arranged holes 234 and 236 described previously. In the illustrated embodiment, the outermost set 234 comprises twenty-four holes; again, however, more or less holes may be utilized. These twenty-four holes 234 form the guides 196, illustrated in FIGS. 3 and 4, through which the bolts 204 utilized to connect the head plate assembly 120 to the base plate assembly 118 extend. In the embodiment illustrated in FIG. 17, inner and outer seals 240 and 242 are shown mounted on the process fluid side of the membrane support plate 218; accordingly, additional holes 244 in the outer seal 242 are illustrated. A detailed explanation of the inner and outer seals 240 and 242 is given below. The remaining, or intermediate set of circularly arranged holes 236 also comprises twenty-four holes; however, as before more or fewer may be utilized. These twenty-four holes 236 form the process fluid conduits 200 when the filter elements 122 are positioned between the head plate assembly 120 and the base plate assembly 118. In the exemplary-embodiment the membrane support plate 218 in this outer region 226 is impervious to fluid flow, except for the holes 236 forming the process fluid conduits 200.

The intermediate region 224 extends between the inner region 222 and the outer region 226, and the permeable membrane 262 is attached to the intermediate region. Accordingly, the intermediate region includes a mechanism for draining permeate away from the permeable membrane, such as depressions or channels which extend all the way or only partially into the membrane support plate 218. In the exemplary embodiment, the membrane support plate 218 in the intermediate region 224 is pervious to fluid flow. For example, the intermediate region 224 may comprise a multiplicity of through holes 238 which may be of any suitable size and shape. In the exemplary embodiment, the holes 238 are extremely small, e.g., about 0.015 inch in diameter, and have a circular geometry. Accordingly, these small holes 238 allow permeate on the downstream side of the permeable membrane 262 to drain from the permeable membrane 202 by passing from the process fluid side to the permeate side of the membrane support plate 218. The small holes 238 principally function to allow permeate flow through the membrane support plate 218. Although the holes 238 are preferably extremely small, there are enough holes 238 to ensure that no excessive pressure build-up exists between the two sides of the filter elements 122. The multiplicity of holes 238 may be spaced apart from each other by any suitable distance and arranged in any suitable pattern, for example, in radial lines. In the exemplary embodiment, the holes 238 are spaced apart by about 0.035 inch, as measured from the center of the holes 238, and are arranged in groups of three in a triangular configuration.

Figure 20:
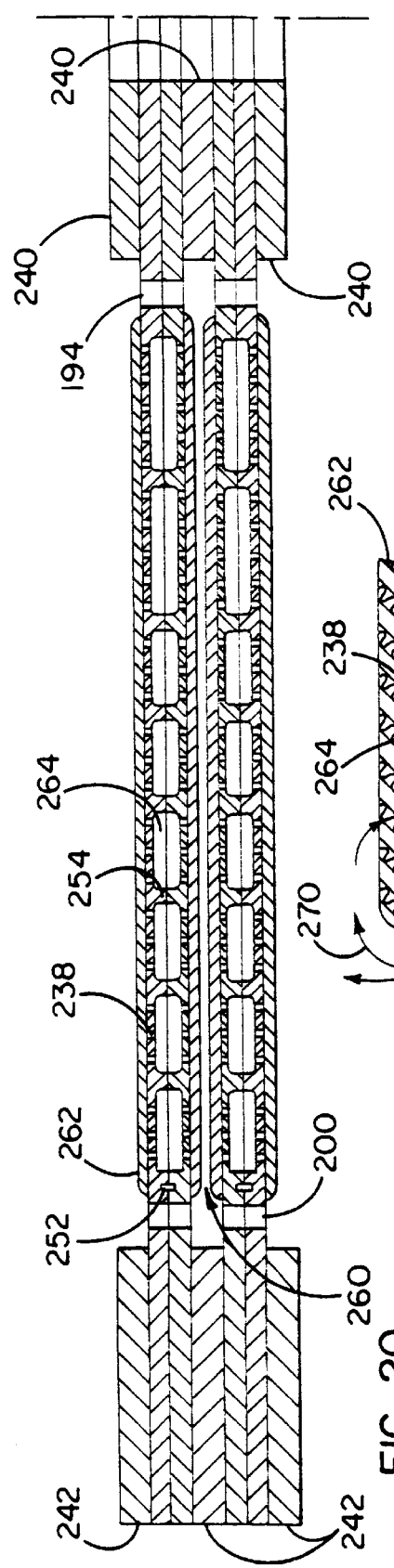
FIG. 20 is a detailed sectional view of a portion of the membrane module.
Figure 21:
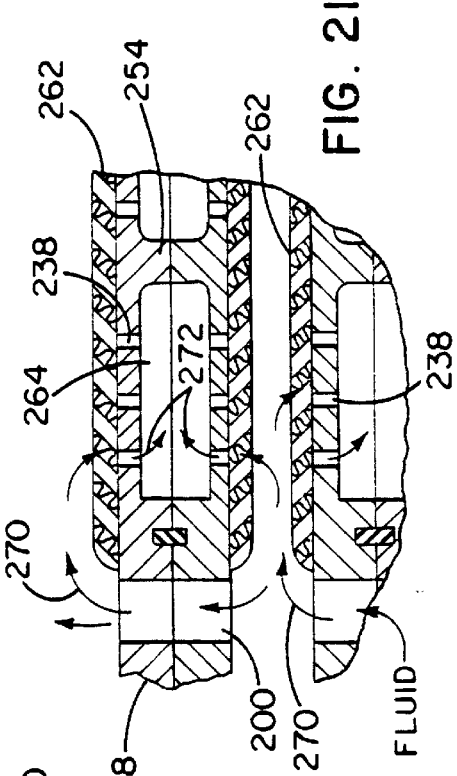
FIG. 21 is a detailed sectional view of a portion of the membrane module of FIG. 20.

Inner and outer seals 240 and 242 may be mounted to the process fluid side of the membrane support plate 218 as stated above. The seals 240 and 242 may comprise any suitable material such as metallic, polymeric or elastomeric materials. In one embodiment, the seals may comprise annular metal rings, and they may be coated to provide a fluid tight seal, as is discussed subsequently. The seals 240 and 242 preferably have a thickness greater than the thickness of the permeable membrane 262 such that a gap 268 is created between the process fluid sides of adjacent paired filter elements 122 in the membrane module 104. This gap 268, which is best illustrated in FIGS. 20 and 21, provides a process fluid flow channel or chamber along the upstream sides of adjacent permeable membranes 262. Alternatively, the inner and outer peripheries of the process fluid side of the membrane support plate may be raised and thereby function similarly to the seals 240 and 242.

The inner and outer seals 240 and 242 may be between 0.005 and 0.500 inches thick, and may preferably range from about 0.020 to about 0.200 inches thick, and more preferably from about 0.040 to about 0.100 inches thick, for example about 0.060 inches thick. The inner seal 240 preferably has an inner diameter substantially equal to the diameter of the central opening 220, and the outer seal 242 has an outer diameter substantially equal to that of the outer diameter of the membrane support plate 218. In addition, the outer seal 242 comprises a plurality of holes 244 which correspond to the outermost set of holes 234 in the membrane support plate 218 as shown in FIG. 18. The outer seal 242, as well as the inner seal 240, may comprise more holes than does the membrane support plate 218. These extra holes are utilized to reduce the overall weight of the system by reducing the weight of the seal itself. The use of the seals 240 and 242, and the stacking of the filter elements 122 in the membrane module 104 is described in detail with reference to FIGS. 20 and 21.

Figure 23A:
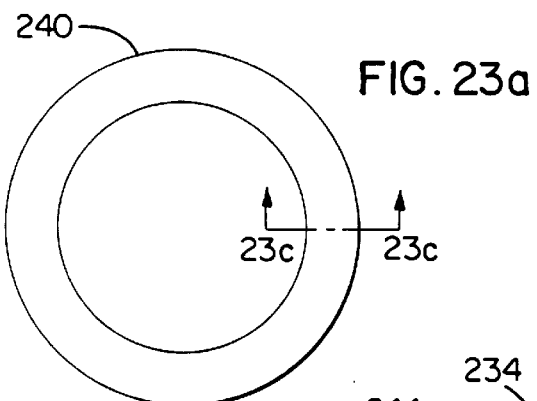
FIGS. 23a and 23b are detailed top views of inner and outer seals of the membrane module.
Figure 23B:
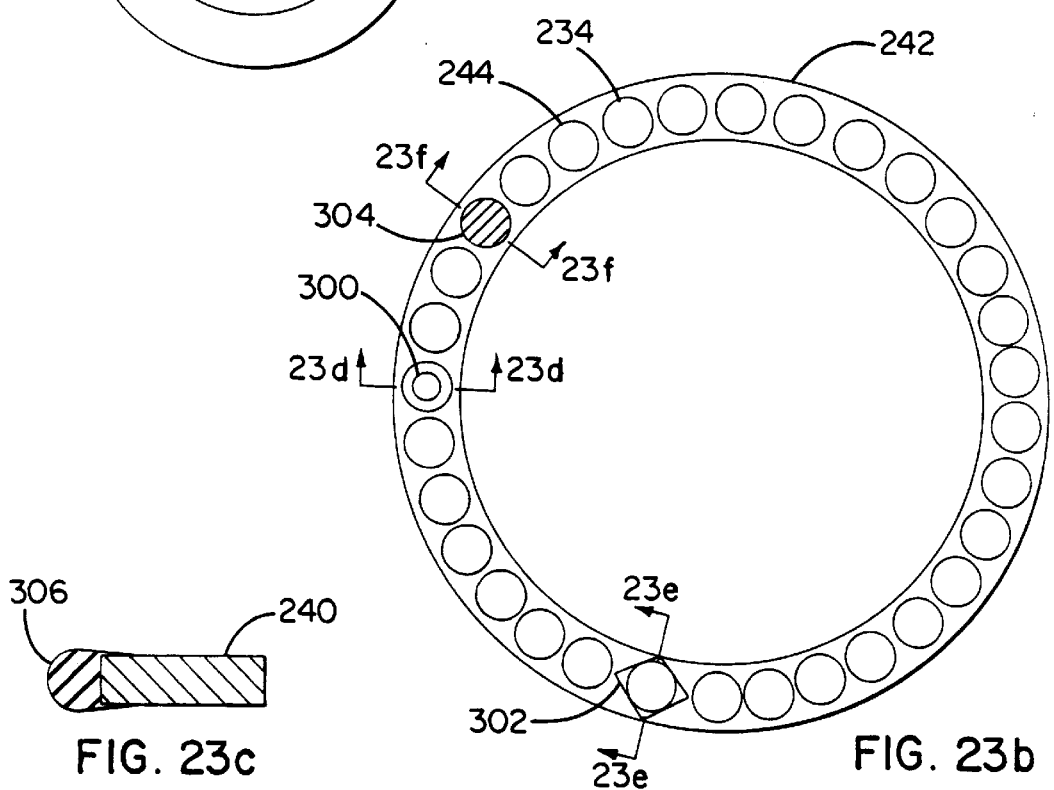

In a preferred embodiment, the inner and outer seals 240 and 242 comprise substantially circular polymeric rings having the same dimensions as the annular metal rings described above. FIGS. 23a and 23b are detailed illustrations of an exemplary embodiment of the plastic inner and outer seals 240 and 242. The plastic rings are lighter than the metal rings, thereby reducing the overall weight of the vibratory separation system and are typically less expensive to manufacture, i.e., less waste of materials. In an exemplary embodiment, some or all of the holes in the inner or outer seal 240 and 242 comprise metal inserts to prevent damage to the outer seal 242. The metal inserts, which have a thickness corresponding to the thickness of the-plastic ring, withstand compressive forces and transmit shear forces better than plastic. Essentially, the metal inserts counter the compressive forces generated when the bolts which secure the filter elements 122 between the base plate assembly 118 and the head plate assembly 120 are tightened, and transmit the shear forces generated by the vibrations in the system during operation. In addition, the metal inserts prevent abrasion damage to the seals 242 which might otherwise be caused by the vibration. The metal inserts may be circular 300 and have a diameter slightly larger than the diameter of the holes 244, or comprise a diamond shape 302. The diamond shape provides a greater surface area than the circular shape, thereby being better able to dissipate the applied forces.

In a preferred embodiment, the metal inserts comprise solid metal inserts, such as solid metal discs 304, which may be positioned in the inner or outer seal 240 or 242, for example, in some of the holes rather than around the edge of the holes as stated above. Accordingly, the metal discs 304 may not be utilized in holes 244 which serve as bolt holes 234. The metal discs 304 may be utilized in every non-bolt hole 244 or in every other non-bolt hole 244. Preferably, when the membrane module 104 is assembled, the metal inserts are axially aligned.

Figure 23C:
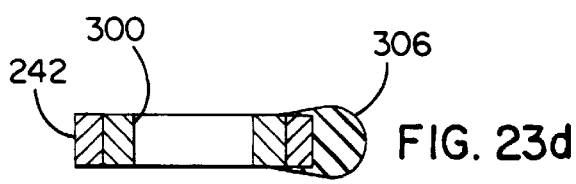
FIGS. 23c, 23d, 23e, and 23f are detailed sectional views of various portions of the inner and outer seals.
Figure 23D:
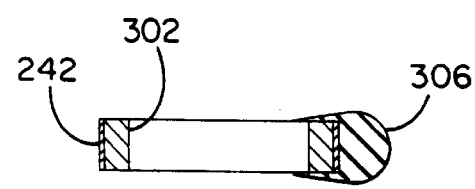
Figures 23E, 23F:
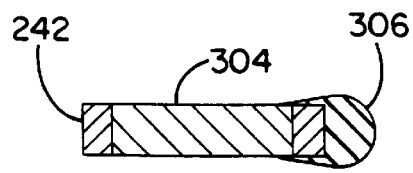

The plastic inner and outer seals 240 and 242 may comprise any suitably rigid polymeric material, and may preferably comprise a polymeric material, such as available under the trade designation NYLON 66, with fiberglass fibers added for structural reinforcement. The metal inserts may comprise any metallic material, such as stainless steel. In the preferred embodiment, the metal inserts may comprise stainless steel. The inner and outer seals 240 and 242 also comprise gaskets 306 as illustrated in detail in FIGS. 23c through 23f. FIG. 23c is a cross-sectional view of the inner seal 240 taken along section line c—c in FIG. 23a, FIG. 23d is a cross-sectional view of the outer seal 242 taken along section line d—d and illustrating the circular metal insert, FIG. 23c is a cross-sectional view of the outer seal 242 taken along section line c—c and illustrating the diamond shaped metal insert 302, and FIG. 23f is a cross-sectional view of the outer seal 242 taken along section line f—f and illustrating the circular disc 304 insert. The gaskets 306 may be mounted to one or both peripheries of the inner and outer seals, e.g., to the inner periphery of the outer seals 242 and the outer periphery of the inner seal 240, to ensure a fluid tight seal. The gaskets 306 may be injection molded elastomeric gaskets 306 which are formed around the edge and sides of the inner/outer periphery of the inner and outer seals 240 and 242 such that the gaskets 306 form a substantially circular cross-section. The thickness of the gaskets 306 is preferably greater than the thickness of the inner or outer seal 240 and 242.

As shown in FIG. 18, the permeate side of the membrane support plate 218 may also be divided into three annular regions; namely, an inner region 246, an intermediate region 248, and an outer region 250. The dimensions of these three regions 246, 248, and 250 correspond roughly with the dimensions of the three regions 222, 224 and 226 of the process fluid side respectively. The outer region 250 of the permeate side may comprise the bolt holes 234, the process fluid holes 236, and a narrow circumferential groove 252 positioned at radial distance corresponding to the inner periphery of the outer region 250. This groove 252 may be utilized to accommodate excessive adhesive which may be utilized as a sealant between filter elements 122 which are paired and between adjacent pairs of filter elements 122.

The intermediate region 248 of the permeate side of the membrane support plate 218 preferably comprises, in the exemplary embodiment, a basin type structure, i.e., the intermediate region 248 is thinner than the outer region 250. The intermediate region 248 of the permeate side comprises a multiplicity of protrusions 254 extending substantially perpendicular from the surface of the basin formed in the permeate side of the membrane support plate 218. The protrusions 254 may be of any shape or size including circular, triangular, cruciform or square. In the exemplary embodiment, the protrusions 254 are substantially cylindrical in shape having a height of about 0.003 to about 0.460 inch as measured from the surface of the basin, and a diameter of about 0.030 inch. The protrusions 254 are arranged in any suitable regular or irregular pattern and in the exemplary embodiment are preferably uniformly spaced apart from one another, for example, by a distance of about 0.3 inch. The multiplicity of holes 238 in the intermediate region 224 on the process fluid side extend through the membrane support plate 218 to the permeate side. The protrusions 254 are preferably positioned in the spaces between the multiplicity of holes 238 in this intermediate region 224, 248 in order to prevent any interference with fluid flow through the membrane support plate 218. Alternatively, instead of protrusions, radially or circumferentially arranged ridges may be utilized. In addition, instead of a raised structure in the basin, the basin may be flat and a layer of polymeric or metal mesh spacer may be placed in this region. As previously indicated, the individual filter elements 122 are mounted in a pairwise manner in the membrane module 104 with the permeate sides of the membrane support plates 218 facing each other; accordingly, the multiplicity of protrusions 254 of each filter element 122 in each pair are preferably in alignment with and make contact with each other such that a permeate flow region is formed in the areas between the protrusions 254.

In the exemplary embodiment, the inner region 246 comprises four raised lands 256 which individually surround the four retentate holes 230 in the inner region, 246. Accordingly, if additional retentate holes are utilized, e.g., eight (8) holes, additional raised lands may be used to surround the holes. Although the lands 256 may have any suitable shape, such as a circular shape, the raised lands 256 are preferably U-shaped and extend from the four holes 230 to the central opening 220. The height, as measured from the surface of the basin, of the four raised land sections 256 may preferably be the same height as the protrusions 254. These raised lands 256 prevent the permeate from flowing into the retentate conduits 198 in the filter elements 122 formed by the four retentate holes 230 in the inner region 222, 246, and prevent the retentate from entering the permeate conduit 202 in the filter elements 122 formed by the central opening 220. Similarly the outer region 250, which is raised relative to the basin in the intermediate region 248, comprises an annular land which surrounds the process fluid holes 236, separating the permeate from the process fluid.

FIG. 19 is a sectional view of the membrane support plate 218. As is seen from the figure, the height, as measured from the surface of the basin, of the protrusions 254 is equal to the height of the outer region 250. The valleys formed between the protrusions 254 are about 0.003 inch to about 0.460 inches, as measured from the permeate side of the membrane support plate 218. The process fluid side of the membrane support plate 218 is preferably smooth, while the permeate fluid side has the multiplicity of protrusions 254 and corresponding valleys. The significance of this unique design is discussed in detail subsequently.

The membrane support plate 218 may be constructed from a single stainless steel plate of uniform thickness. Stainless steel is preferred because of its high strength and dimensional stability, even at thicknesses as thin as about 0.002 inch. The multiplicity of holes 238, the basin, and the protrusions 254 in the intermediate region 224, 248 and the channels 258 between the four raised U-shaped lands 256 in the inner region 246 may be formed in any suitable manner including mechanical punching, photochemical etching, electro-discharge machining (EDM), or electron beam and laser etching. In the most preferred manner, the membrane support plate 218 may be formed by photochemical etching due to its ability to provide smaller topography on an etched surface compared to, for example, EDM.

Alternatively, the membrane support plate 218 may be constructed from a thermoplastic material having a sufficiently high strength to withstand the vibratory forces. The holes 234, as illustrated in FIG. 17, which form guides for bolts or other securing devices may comprise metal inserts to protect against wear due to vibration. A membrane support plate 218 comprising a thermoplastic material may be easily and relatively inexpensive to manufacture. If the cost of manufacturing membrane support plates is inexpensive enough, sub-modules, as discussed above, comprising, for example, ten filter elements, may be manufactured as disposable membrane modules.

The permeable membrane 262 may comprise any suitable filter medium, such as a porous or semipermeable polymeric film or a woven or non-woven sheet of polymeric or non-polymeric fibers or filaments. Alternatively, the membrane 262 may comprise a porous metal media, such as the media available from Pall Corporation under the trade designations PMM and PMF, a fiberglass media, or a porous ceramic media. For the exemplary embodiment the permeable porous membrane may include microporous membranes. The membrane may be prepared from any suitable material and will typically be prepared from a polymeric material such as polyamide, polyvinylidene fluoride, polytetrafluoroethylene, polysulfone, polyethersulfone, polyethylene, and polypropylene. More preferred membranes are polyamide, e.g., nylon, and polytetrafluoroethylene membranes with the most preferred membrane being a polytetrafluoroethylene membrane. The preparation of these types of membranes is described in, for example, U.S. Pat. No. 4,340,479. Further, the permeable membrane 262 may comprise one or more layers. For example, the permeable membrane 262 may include a microporous membrane and a fibrous layer. The fibrous layer may be disposed adjacent to the microporous membrane for support and/or drainage.

The permeable membrane 262 may be attached to the intermediate region of the membrane support plate 218 in any suitable manner depending, for example, on the composition of the membrane support plate 218 and the permeable membrane 262. The permeable membrane 262 may be welded to the membrane support plate 218 in a variety of ways or it may be bonded to the membrane support plate 218 by an adhesive or a solvent. Preferably, the surface of the membrane support plate 218 is roughened, for example, by oxidation, prior to attaching the permeate membrane 262 to the membrane support plate 218. This roughening of the surface typically aids the bonding process.

Preferably, a polymeric microporous membrane such as polytetrafluoroethylene is bonded to a metallic membrane support plate such as stainless steel by way of a nonwoven web of thermoplastic multicomponent fibers. The multicomponent fibers may comprise at least a first polymer and a second polymer such that the second polymer is present on at least a portion of the surface of the multicomponent fibers and has a melting temperature below the melting temperatures of the first polymer. For example, the multicomponent fibers may comprise at least about 60 weight percent of the first polymer and no more than about 40 weight percent of the second polymer.

The multicomponent fibers of the nonwoven web can be prepared from any suitable polymers. Preferably, the multicomponent fibers of the nonwoven web will be prepared from suitable polyolefins. Suitable polyolefins include polyethylene, polypropylene, and polymethylpentene. The first polymer is preferably polypropylene, with the second polymer preferably being polyethylene. The fibers of the nonwoven web can be prepared by any suitable means and formed into a nonwoven web by any suitable means, such as the conventional Fourdrinier paper making processes. While the multicomponent fibers are preferably bicomponent fibers, i.e., fibers prepared from only two polymers, the multicomponent fibers can be prepared from more than two polymers, i.e., the first and/or second polymers as described herein can be thought of as polymer blends.

The particular combination of polymers for the multicomponent fibers may be chosen such that the melting temperatures of the first and second polymers differ sufficiently enough that the melting of the second polymer can be effected without adversely affecting the first polymer. Thus, the first polymer preferably has a melting temperature at least about 20° C. higher, more preferably at least about 50° C. higher, than the melting temperature of the second polymer. The second polymer will typically have a melting temperature of about 110° C. to about 200° C., more typically about 110° C. to about 150° C.

The adherence of the permeable membrane 262, nonwoven web, and the membrane support plate 218 is effected by subjecting the nonwoven web to a temperature above the melting temperature of the second polymer but below the melting temperatures of the first polymer, permeable membrane 262, and membrane support plate 218. In other words, the nonwoven web is subjected to a temperature sufficient to at least partially melt the second polymer without significantly melting the other components of the filter. This process is described in U.S. patent Ser. No. 08/388,310, assigned to the same assignee as the present invention, and is incorporated by reference herein.

The bonding technique described above for bonding the permeable membranes 262 to the membrane support plates 218 enables the membrane module 104 to be used in high shear environments with no substantial risk of the permeable membranes 262 separating from the membrane support plates 218. Having a bond of this nature enables the process conditions, i.e., flow rates and pressures, to be somewhat flexible. For example, the system does not have to be fully pressurized before vibratory motion is imparted to the membrane module 104. In addition, because of the strong bond, the process fluid need not be pumped in under high pressure in order to hold the permeable membranes 262 to the membrane support plates 218. The process fluid may be passed through the membrane module 104 at a relatively low pressure, thereby enabling a longer life for the permeable membranes 262 as described in detail subsequently.

In one embodiment, in order to further secure the permeable membrane 262 to the membrane support plate 218, the permeable membrane 262 may extend radially outward and radially inward past the intermediate region 224 such that it may be secured to the membrane support plate 218 by the inner and outer seals 240,242. Preferably, the permeable membrane 262 would be large enough to be secured by the leading edge of the inner and outer seals 240,242 without blocking the bolt holes 234. When the seals 240,242 and the membrane support plates 218 are compressed by the bolts, thereby forming the membrane module 104, the seals 240, 242 compress each permeable membrane 262 at its outer and inner periphery against the membrane support plate 218, thereby securing the edges of the permeable membranes 262.

In extending the permeable membranes 262 past the intermediate region 224 and under the seals 240,242, the holes 230 forming the retentate conduits 198 and the holes 236 forming the process fluid conduits 200 would be covered by the permeable membrane 262 when the permeable membrane 262 is laid down on the membrane support plate 218. Accordingly, in an additional manufacturing step holes are cut in the membrane. For example, when a pair of filter elements 122 are formed, the filter elements 122 are aligned with one another and a hole may be cut through both of the membranes 262 of the pair at the holes 230,236. A metal islet may be inserted into each of these holes 230,236 and smoothly crowned over the membranes on both sides of the pair.

As shown in FIG. 20, the membrane module 104 may comprise the filter elements 122 stacked in a pairwise manner with the inner and outer seals 240 and 242, preferably only one of each, between adjacent pairs of the filter elements 122. A film or an adhesive, such as a thermal plastic adhesive/sealant may be used to bond the outer regions 250 and the raised lands 256 on the permeate side of each pair of filter elements 122 and to bond the surfaces of the inner and outer seals 240 and 242 to the inner and outer regions 222 and 226 on the process fluid sides of adjacent pairs of filter elements, providing a fluid tight seal. If plastic inner and outer seals 240 and 242 are utilized, an adhesive may not be necessary.

The permeate sides of the membrane support plates 218 of each filter element 122 in the pair face each other such that the multiplicity of protrusions 254 are preferably in alignment with and contact one another, defining a permeate chamber 264 which communicates with the permeate conduit 202. However, each permeate chamber 264 is isolated from the process fluid and retentate conduits 200 and 198 by the face-sealed lands surrounding the process fluid and retentate holes 236 and 230.

The inner and outer seals 240 and 242 create gaps between the process fluid sides of adjacent pairs of filter elements 122, defining a process fluid chamber 260 which communicates with the process fluid and retentate conduits 200 and 198. The gaps between the process fluid sides of adjacent pairs of filter elements 122 may also be created by other suitable structures, for example, raised portions on the membrane support plate 218 rather than by the inner and outer seals 240,242. The gaps may be of equal thickness or of variable thickness. For example, the gaps between the process fluid sides of adjacent pairs of the lower filter elements 122 may be narrower than the gaps between the upper filter elements. Accordingly, there would be narrow gaps in proximity to the process fluid inlets 106 and wider gaps in proximity to the process fluid outlets 112. Variable thickness gaps may be utilized to normalize fluid pressure differentials. In an exemplary embodiment, the thickness of the gaps may be set utilizing inner and outer seals 240 and 242 of varying thickness. However, each process fluid chamber 260 is isolated from the permeate conduit 202 by the inner seal 240, which surrounds the central opening 200. The permeable membranes 262 are mounted to the intermediate region 224 of the process fluid side of the membrane support plates 218 between the inner and outer seals 240 and 242 and have a negligible thickness, for example, substantially less than half the thickness of the inner and outer seals 244 and 242. Accordingly, the gap width of each process fluid chamber 260 may be between 0.005 and 0.500 inches, and may preferably range from about 0.020 to about 0.200 inches, and more preferably from about 0.040 to about 0.100 inches, for example, about 0.060 inches.

Preferably, each process fluid chamber 260 is free of any structure which would tend to inhibit fluid motion. For example, each process fluid chamber 260 is open radially along the entire intermediate region of the membrane support plates 218 and circumferentially 360 degrees around the membrane support plate 218. Alternatively, each process fluid chamber may be substantially free of structure, i.e., have few if any structures which may minimally inhibit fluid motion within the process fluid chamber. Consequently, the process fluid can freely move with respect to the permeable membranes 262 of adjacent pairs of filter elements 122 in the process fluid chambers 260.

The membrane module 104 may have only one filter element 122 sandwiched between the head plate assembly 120 and the base plate assembly 118 but more preferably comprises a plurality of filter elements 122. For example, one, two, five, ten, twenty-five, fifty, seventy-five, one hundred, or more pairs of filter elements 122 may be secured between the head and base plate assemblies 120 and 118.

The laminar construction of the membrane module 104, where any desired number of filter elements 122 and inner and outer seals 240 and 242 are simply stacked and sealed to one another, provides a flexibility to the fabrication process which accommodates a wide variety of process conditions. The laminar construction also simplifies the structure of the membrane module. The laminated outer periphery of the membrane module preferably forms an outer containment wall which isolates the process fluid, the permeate, or both on the inside of the wall from the ambient environment on the outside of the wall. In addition, the laminated stack structure defines an inner laminated wall. In the exemplary embodiment, the outer laminated containment wall comprises a stack of filter elements 122 and outer seals 242, but in alternative embodiments it may be differently configured, e.g., as a stack of filter elements without any seals. By isolating the process fluid and the permeate from the ambient environment, the laminated containment wall obviates an outer membrane module housing. Not only does this simplify construction, but it also reduces weight, and, therefore, the moment of inertia.

Alternative methods and materials may be used to bond the outer regions 250 and the raised lands 256 on the permeate side of each pair of filter elements 122 and to bond the surfaces of the inner and outer seals 240 and 242 to the inner and outer regions 222 and 226 on the process fluid sides of adjacent pairs of filter elements 122. For example, these surfaces may be welded, brazed, epoxied, or have a gasket placed therebetween. Alternatively, an injection molded gasket spacer in which the gasket is directly injection molded onto the particular surfaces may be utilized. Any suitable material such as silicone may be utilized to form the gasket. Preferably, ethylene propylene diene monomer, EPDM, is utilized for the gasket. The use of the injection molded gasket offers the advantage of being a non-binding sealant, i.e., the various components may be easily separated once the bolts or other securing means are removed. In a preferred embodiment, a thermoplastic adhesive/sealant is utilized. The thermoplastic adhesive/sealant may comprise any suitable copolymer of polyethylene and ethylene vinyl acetate such as available from OLIVER PRODUCTS COMPANY, Grand Rapids, Mich., under the trade name 10SE and described in U.S. Patent Application entitled "Filtration Device," U.S. Ser. No. 08/489,802, filed on Jun. 13, 1995 by Gildersleeve et al., assigned to the same assignee as the present invention, and incorporated by reference herein.

Additionally, the injection molded gasket spacer may be utilized in combination with the thermoplastic adhesive/sealant. For example, as stated above, the membrane module 104 may comprise a number of sub-modules, and the sub-nodules may be assembled utilizing the thermoplastic adhesive/sealant, i.e., a permanent bonding, and the sub-modules may be assembled into the membrane module utilizing the injection molded gasket spacers, i.e., non-binding seals, between adjacent sub-modules.

Another important advantage associated with a membrane module embodying the present invention is a very high filter surface area to volume ratio. For example, in the exemplary embodiment, the total permeable membrane surface area available for filtration may be compared to the total volume occupied by the stack of filter elements 122. In the exemplary embodiment, there may be one hundred circular pairs of filter elements 122, each having an outer diameter of approximately twenty-four inches. Each filter element 122 comprises a single permeable membrane 262 which may have an inside diameter of 8.0 inches and an outside diameter of 20.0 inches. Therefore, the total surface area of each permeable membrane 262 may be approximately two hundred sixty-four (264) square inches and the total filter surface area of all two hundred filter elements 122 is about fifty-two thousand eight hundred square inches (52,800) or 367 cubic feet. The total volume occupied by the one hundred pairs of filter elements 122 may be calculated as the volume of a right circular cylinder since the filter elements 122 have a substantially circular configuration. In one embodiment wherein the thickness of each membrane support plate 218 in 0.012 inches and the gap created by the seals 240, 242 is 0.060 inches, the total height of the membrane module 104, excluding the head and base plate assemblies 120 and 118, may be calculated as the total thickness of one hundred pairs of support plates 218 (0.012× 2×100=2.4 inches) plus the total thickness of ninety-nine gaps (0.060×99=5.94 inches). Accordingly, the total height is 8.34 inches. Therefore, the total volume occupied by the one hundred pairs of filter elements 122 in this exemplary embodiment is 2,202 cubic inches or approximately 1.3 cubic feet. Accordingly, the filter surface area to volume ratio is approximately 282 ft$^2$/ft$^3$. In accordance with one aspect of the invention, because the thickness of each membrane support plate 218 may be so small, an enormous filter surface area may be packaged in a very small volume. Accordingly, the filter surface area to volume ratio for the exemplary embodiment may be greater than 100 ft$^2$/ft$^3$ or greater than 150 ft$^2$/ft$^3$ or greater than 200 ft$^2$/ft$^3$ or greater than 250 ft$^2$/ft$^3$ and may be as high as 1,100 ft$^2$/ft$^3$ or higher. A ratio in the range of about 3 ft$^2$/ft$^3$ to about 1,100 ft$^2$/ft$^3$, preferably in the range from about 100 ft$^2$/ft$^3$ to about 1,100 ft$^2$/ft$^3$, more preferably in the range from about 150 ft$^2$/ft$^3$ to about 600 ft$^2$/ft$^3$, more preferably from about 150 ft$^2$/ft$^3$ to about 400 ft$^2$/ft$^3$, and in the range of up to about 250 ft$^2$/ft$^3$ is more preferred for a vibratory separation assembly embodying the invention. The high filter surface area to volume ratio of the vibratory separation assembly not only enhances throughput, but it also reduces the weight and, therefore, the moment of inertia.

In a preferred mode of operation, process fluid is directed under pressure into the membrane module 104 through the process fluid inlets 106 which are illustrated in FIGS. 3 and 4. The process fluid may be directed to the vibratory separation assembly 100 by a pump as illustrated in FIG. 1, or by any other means suitable for pressurized delivery of the process fluid. Although the process fluid inlets 106 are positioned in the base plate assembly 118, they may be positioned in the head plate assembly 120 or at a position between the head plate assembly 118 and the base plate assembly 120 without affecting the operation of the vibratory separation filter assembly 100. The process fluid flows through the process fluid inlets 106 and into the lower process fluid channel 132 of the base plate 124. The process fluid is evenly distributed through the lower process fluid channel 132 by the pressure of the incoming process fluid and is directed through the base plate process fluid conduits 134 into the upper process fluid channel 130 of the base plate 124. The process fluid is evenly distributed through the upper process fluid channel 130, again, by the pressure of the incoming process fluid and is directed through the process fluid conduits 200 formed by the filter elements 122 and which communicate with upper process fluid channel 130. As shown in FIG. 21, the process fluid conduits 200, which extend through the entire height of the stack of filter elements 122 have gaps between adjacent pairs of filter elements 122 through which the process fluid may flow into the process fluid chambers 260.

In a preferred mode of operation, non-uniform flow parameters within the process fluid chambers 260, e.g. varying fluid flow rates and/or varying fluid pressure differentials from the process fluid conduits 200 through the process fluid chambers 260 across the filter elements 122 to the retentate conduits 198 are avoided. In a system where the flow parameters of the process fluid are not substantially uniform for each of the filter elements, preferential fouling of the filter elements may occur, thereby resulting in a less efficient, shorter life filtration system. Preferential fouling of the filter elements may occur through the non-uniform distribution of pressure differences across the filter elements. A first filter element subjected to a greater pressure differential than a second filter element may foul faster because the high pressure difference forces more process fluid through that filter element. The same principle holds true for fluid flow rates, i.e, the filter element subjected to a higher fluid flow rate may foul faster. Preferential fouling reduces filter efficiency because of a cascading effect. Once the first filter element becomes completely fouled, the preferential fouling shifts to the next filter element and the process accelerates because the change in flow parameters increases.

For many applications, substantially uniform flow parameters may be achieved and maintained in the process fluid chambers by closing both the process fluid outlet 112 and the retentate inlet 113. Process fluid then flows from the process fluid conduits 200 through the process fluid chambers 260 across or tangential to the permeable membranes 262 of each of the filter elements 122, each experiencing substantially the same flow parameters, to the retentate conduits 198.

For other applications, substantially uniform flow parameters may be achieved and maintained in the process fluid chambers by opening either or both the process fluid outlet 112 and the retentate inlet 113. For example, the retentate inlet 113 may be closed and the process fluid outlet 112 may be opened and connected to the process fluid inlets 106 via, for example, a return line 312 and valve 314, as illustrated in FIG. 1, so that the process fluid may be recirculated at a specific flow rate. This second arrangement may be described as a process fluid recirculation loop. With the process fluid outlet 112 open, the process fluid flows from the process fluid conduits 200 to the process fluid outlet 112 for recirculation to the process fluid inlets 106 and from the process fluid conduits 200 through the process fluid chambers 260 across or tangential to the permeable membranes 262 of each of the filter elements 122, each experiencing substantially the same flow parameters, to the retentate conduits 198. The process fluid inlets 106 and the process fluid outlet 112 both communicate with a first region of the upstream surface of each of the permeable membranes 262. The retentate outlet 108 communicates with a second region of the upstream surface of each of the permeable membranes 262, and the process fluid flow rate is largely decoupled from the flow rate of the retentate.

Figure 24:
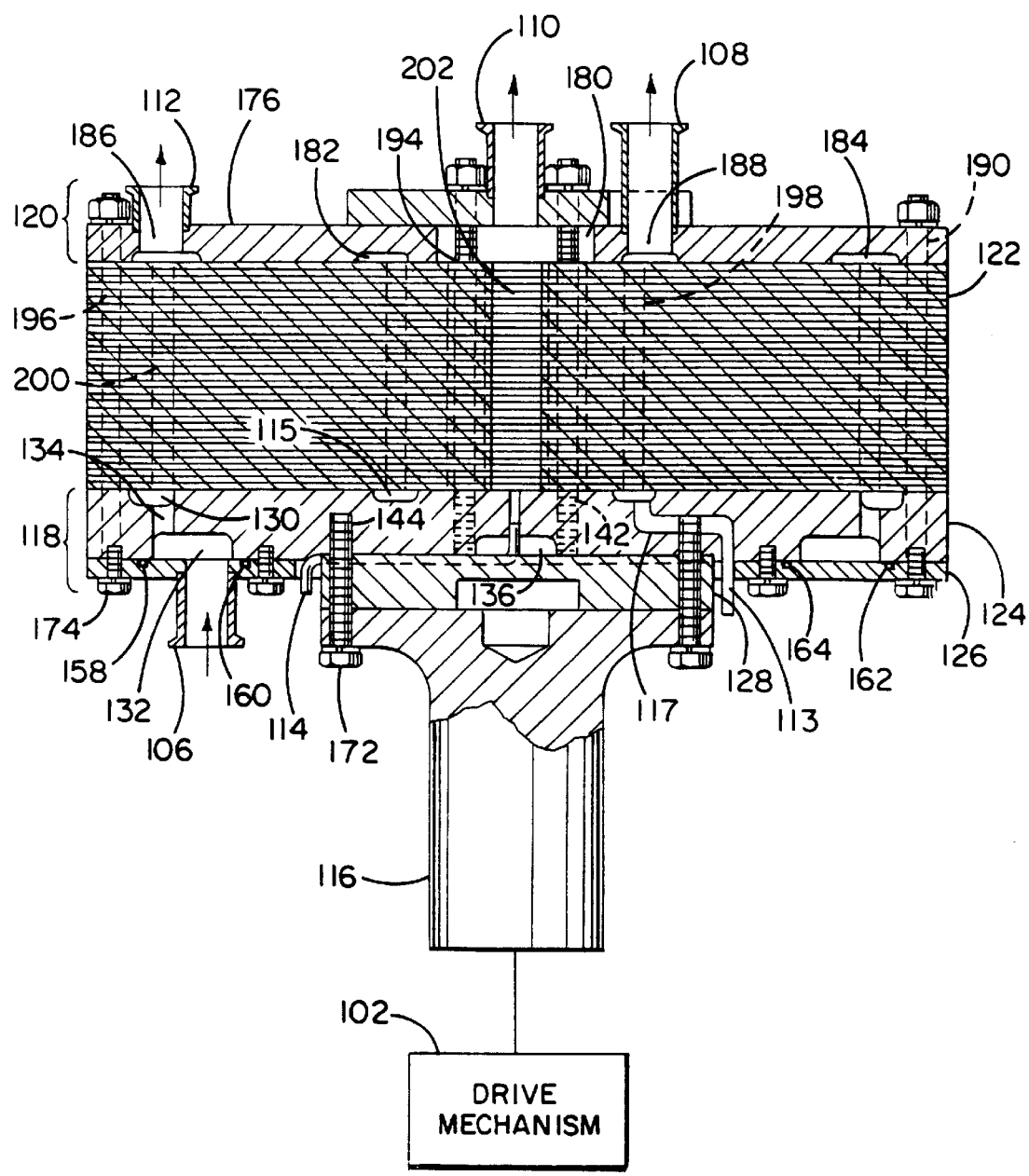
FIG. 24 is a sectional view of an alternative embodiment of the vibratory separation assembly.

Alternatively or in addition to the above-described process fluid recirculation loop, the vibratory separation system may comprise a retentate loop as briefly described above. Alternatively, in many applications the retentate inlet 113 may be closed just as the process fluid outlets 112 may be closed and process fluid flows along the process fluid chambers with each experiencing substantially the same flow parameters. The retentate recirculation loop may comprise a valve assembly or a pump assembly 406 connected between the retentate outlet 108 and a retentate inlet 113, which are illustrated in FIGS. 1 and 24. The retentate inlet 113 may be connected to the retentate conduits 198 via a retentate inlet channel 115 and a retentate inlet conduit 117 in the base plate assembly 118. Preferably, the retentate inlet conduit 117 is as straight as possible, i.e., no bends or curves, to ensure that the retentate freely moves therethrough. Generally, the retentate is the most viscous fluid in any separation system; accordingly, the straightest path possible is preferred. In this arrangement, the retentate inlet 113 and the retentate outlet 108 both communicate with the second region of the upstream surface of each of the permeable membranes 262, and the retentate flow rate is largely decoupled from the flow rate of the process fluid.

The process fluid outlet flow rate and the retentate outlet flow rate are preferably selected such that the flow parameters, such as pressure differential, from the process fluid conduits 200 to the retentate conduits 198 across each filter element 122 are substantially the same. For example, the flow rates through the process fluid recirculation loop and the retentate recirculation loop may be maintained such that the pressure gradient provides a substantially similar cross membrane pressure differential through each of the process fluid chambers 260. By maintaining a substantially similar cross membrane pressure differential, preferential fouling of the filter elements 122 may be substantially reduced or prevented. In addition, the vibratory separation system may be more easily scaled up, i.e., additional filter elements 122 added, because the addition of further filter elements 122 would not substantially affect the cross membrane pressure differential. Thus, the fluid flow established through three process fluid chambers 260 (six filter elements 122) may be easily extended to ten process fluid chambers 260 (20 filter elements 122) since the cross membrane pressure differential does not substantially change.

The process fluid outlet flow rate and the retentate flow rate may be varied depending upon the particular application, as process fluids and conditions vary. For example, the process fluid outlet flow rate may be greater than, equal to, or less than the retentate flow rate. Manipulation of these flow rates allows additional flexibility because the number of filter elements 122 comprising the membrane module 104 may be changed, i.e. scaled up or down, without degrading performance.

As the process fluid flows from the process fluid conduits to the retentate conduits past the permeable membranes 262, the membrane module 104 is being vibrated by the drive mechanism 102 at a predetermined frequency and amplitude to create a shear flow boundary layer at the surfaces of the permeable membranes 262 facing the process fluid, i.e., the upstream surfaces. Although the permeable membranes 262 may not be smooth, they do provide a relatively uniform surface across the process fluid side of the permeable membrane 262. In other words, there are no significant protrusions which would inhibit fluid flow across the surface. Accordingly, as the membrane module 104 is vibrated by the drive mechanism 102, the bulk of the process fluid between the permeable membranes 262 of adjacent pairs of filter elements 122 does not move at or near the same frequency and/or amplitude as the permeable membranes 262. Therefore, there is relative movement between the process fluid and the permeable membranes, and it is this relative movement that generates dynamic flow conditions which tend to prevent the deposition of fluid components such as particulate matter or colloidal matter in the vicinity of the permeable membranes 262 onto the permeable membranes 262. Therefore, fouling and clogging of the permeable membranes 262 is greatly reduced. The vibration parameters required to lift particulate matter off of the permeable membranes 262 may depend on a number of factors including fluid viscosity, fluid density, flow rate, and the size and character of the particulate and/or colloidal matter. The drive mechanism 102 may vibrate the membrane module 104 at a frequency in the range of about 5 to about 500 Hz, preferably about 10 to about 120 Hz, and more preferably in the range of about 20 to about 80 Hz, and even more preferably in the range from about 30 to about 70 Hz. For any size membrane support plate, the amplitude of vibration may preferably be less than about 90 degrees and more preferably less than about 75 degrees. The amplitude of vibration, for example in a system utilizing a membrane support plate 218 having a diameter of 24.0 inches, may range from about 0.250 inch (approximately 1.2 degrees) to about 12 inches (approximately 57.3 degrees) or more as measured at the outer periphery thereof, more preferably from about 1.500 inches (approximately 7.2 degrees) to about 3.0 inches (approximately 14.3 degrees) inches, and even more preferably about 2.0 inches (approximately 9.5 degrees), as measured at the outer periphery thereof.

As the membrane module vibrates, a portion of the process fluid, i.e., the permeate, passes through the permeable membranes 262, through the holes 238 in the membrane support plates 218 and into the permeate chambers 264 created between the permeate sides of the filter elements 122. The permeate is then directed through the permeate chambers 264 among the plurality of protrusions 234, between the retentate lands 256, and into the permeate conduit 202. In contrast to the process fluid, the permeate which is in the permeate chambers 264 may preferably be constrained to vibrate at or near the frequency and amplitude of vibration of the membrane module 104 by the protrusions 254 on the permeate sides of the filter elements 122. These protrusions 254, which are fixed to the membrane support plates 218 and vibrate with the membrane module 104, may facilitate the movement of the permeate at or near the same vibrational frequency and amplitude as the membrane module. In addition, the protrusions 254 provide structural support for the paired membrane support plates 218. Alternatively, the permeate chambers 264 may be open chambers like the process fluid chambers 260. Once the permeate enters the permeate conduit 202, it is directed to the permeate outlet 110 in the head plate assembly 120 where it may be recovered for various purposes through the permeate recovery arrangement 500, as illustrated in FIG. 1. As stated above with respect to the process fluid inlets 106, the permeate outlet 110 is not limited to placement in the head plate assembly 120.

The portion of the process fluid which does not pass through the permeable membranes 262, i.e., the retentate, flows through the process fluid chambers 260 into the retentate conduits 198. The retentate flows through the retentate conduits 198, into the retentate outlet channel 182 in the head plate 196 and out through the retentate outlet 108 in the head plate assembly 120 where it flows into the retentate recovery arrangement 400. The retentate outlet 108, like the permeate outlet 110 and the process fluid inlets 100 is not restricted to a specific location on the membrane module 104.

The retentate and the permeate may be utilized for a wide variety of purposes as previously explained. Either the permeate, retentate, or both the permeate and retentate may be the important products of the filtration process. Therefore, the design of the permeate and retentate recovery arrangements 400 and 900 may vary.

The slope in the upper surface of the base plate 124 and the slope in the lower surface of the head plate 176, as explained above, tend to tension and hold the filter elements 122 at a slight angle relative to the horizontal plane defined by the lower surface of the base plate 124, i.e., a conical shape. Specifically, the metal membrane support plates 218 of each of the filter elements 122 are forced into this conical shape and held in this position when secured between the angled base plate assembly 118 and the angled head plate assembly 120. In an alternative embodiment, the membrane support plates 218 may be conically shaped by adding additional seals or spacers between adjacent pairs of filter elements 122 in an inner peripheral region thereof. For example, one or more additional inner seals 240 (illustrated in FIG. 17) may be mounted to the process fluid sides of the membrane support plates 218. Alternatively, the membrane support plates 218 may be conically shaped. Alternatively, both the membrane support plate 218 as well as the head plate 176, and the base plate 124 may be flat.

In forcing and holding the membrane support plates 218 in a conical shape, three important results are achieved. Firstly, the conical shape of the membrane support plates 218 facilitates the removal of gas which may be trapped between adjacent pairs of permeable membranes 262, i.e., the process fluid chambers 260. Trapped gas in the process fluid chambers 260 may degrade system performance. Basically, in having a conical shape, process fluid from the process fluid conduits preferably enters the process fluid chambers at or near the lowest point in each chamber and the gas in the process fluid chambers 260 rises ahead of the process fluid filling the chambers 260. Therefore, the process fluid forces the gas out of the system as the process fluid travels upwards towards the inner regions of the system to the retentate conduits 198. Similarly, permeate fills the lower portion of the permeate chambers first and the gas in the permeate chambers rises ahead of the permeate. This is especially advantageous for a hydrophobic medium, such as a polytetrafluoroetheylene medium, which otherwise has a tendency to hold onto gas as the membrane module 104 fills with process fluid. Secondly, the conical shape of the membrane support plates 218 facilitates the flow of process fluid into and through the process fluid chambers 260. Basically, the slope facilitates a uniform flow distribution of process fluid in the process fluid chambers 260. The process fluid filling the chambers 260 uniformly from the lower portion to the upper portion of the chamber 260. Thirdly, the conical shape of the membrane support plates 218 adds structural integrity to the membrane module 104. Specifically, forcing and holding the membrane support plates 218 in a conical shape tensions the membrane support plates 218, thereby increasing their rigidity and preventing sagging. The added rigidity facilitates the maintenance of a uniform gap width in the process fluid chamber 260, i.e., an open channel. Typically, in systems having high filter surface area, open channels between filter elements are not utilized because of the extra weight required to maintain the gap width of the channel for example, through heavy support plates, spacers, or drainage meshes. However, in the present invention, the gap width of the process fluid chambers 260 are maintained through the use of metal membrane support plates 218 which are made more rigid by forming or forcing them into a conical shape.

Generally, conventional membrane modules having a high filter surface area to volume ratio may not comprise an open channel design, i.e., process fluid chambers being substantially free of obstructions. The reason for this being that in conventional modules, in order to increase filter surface, larger support plates are needed. These support plates require additional support structures between them to maintain equal gaps between the filter elements. Consequently, these known devices are not able to recognize the advantage of an open channel design in a membrane filter having a high filter surface area to volume ratio. Specifically, an open channel design is particularly effective in filtering fluids containing particulate matter because such fluids do not flow well edgewise through a porous support media.

The structure and operation of a vibratory separation system embodying the invention are subject to a wide variety of variations. For example, in the above-described operation, the process fluid flows in a parallel direction across each filter element of the membrane module. However, the membrane module may be configured in a different manner thereby achieving different results, for example, serial flow past the filter elements. In one example of this type of arrangement, the membrane support plates are formed such that one filter element has fluid holes in the outer region but no fluid holes in the inner region and the next filter element in the stack has fluid holes in the inner region but no fluid holes in the outer region. Process fluid flow then proceeds in serial from the holes in the outer region radially inward along the process fluid chamber to the holes in the inner region, through the holes in the inner region to the next process fluid chamber in the stack, and then from the holes in the inner region radially outward along the process fluid chamber to the holes in the outer region.

Generally, there may be different arrangements for the vibratory separation system for different applications. In one alternative embodiment, the permeate conduit 202 becomes the retentate conduit and the retentate conduits 198 become the permeate conduits. This embodiment may be particularly advantageous for highly viscous fluids. As stated above, the retentate is generally a highly viscous fluid; accordingly, directing the retentate through a single, large diameter centrally positioned conduit rather than small diameter multiple conduits may result in a reduction in the axial pressure differential in the retentate conduit. This reduction in the pressure differential may, in turn, facilitate the movement of the fluid from the process fluid conduits through the process fluid channels to the central retentate conduit. The permeate, which is generally not very viscous and always less viscous than the retentate may be easily removed through the multiple permeate conduits. In addition, a process fluid recirculation loop and/or a retentate recirculation loop, as described above, may also be utilized.

In another alternative embodiment, the number of retentate conduits may be increased from four to eight or more to reduce the axial pressure differential in the retentate conduits. In addition, rather than having the retentate conduits communicate with the retentate outlet channel in the head plate, the retentate conduits may extend through the head plate and communicate with a retentate outlet channel in the head plate cover. Two retentate outlets may then be disposed on the top of the head plate cover, and these retentate outlets communicate through the openings in the head plate cover to the retentate conduit channel in the lower surface of the head plate cover. This arrangement provides a larger surface area path for the retentate, thereby minimizing the pressure drop in the retentate conduits.

In a second alternative embodiment, the vibratory separation system comprises groups of permeate chambers, each group comprising one or more permeate chambers. A separate permeate conduit may communicate with each group and may be isolated from all other groups. With this design a single group may be utilized to test various membranes on a single process fluid. For example, three groups having at least one pair of filter elements may be configured as follows. The first group comprises filter elements having PTFE membranes, the second group comprises filter elements having PES membranes, and the third group having nylon membranes. A separate permeate conduit would communicate with each group. The quality of permeate may be sampled from each group to determine, for example, which type of membrane works best. Alternatively, each permeate chamber may be positioned and a separate permeate conduit may communicate with each sub-chamber.

In still another alternative embodiment, the vibratory separation system may comprise a membrane module including a center base plate assembly, a lower head plate assembly, and an upper head plate assembly. The process fluid may be supplied through the center base plate assembly to pairs of filter elements positioned on both sides or above and below the center base plate assembly. This embodiment may also be particularly advantageous for very thick, viscous process fluids and/or retentates. Essentially, this arrangement would provide shorter retentate conduits, and since the retentate is the most viscous fluid in the system, there is a lower retentate differential pressure across the shorter retentate conduits.

In applications where the retentate may be extremely viscous, the gaps between adjacent pairs of filter elements 122 may be widened to allow the retentate to flow therethrough. In this embodiment, because the thickness of each membrane support plate 218 may be so small, the filter surface area to volume ratio may still be high. For example, as calculated previously, the total filter surface area of all two hundred filter elements is about 52,800 square inches or 367 square feet. If the thickness of each membrane support plate 218 is 0.012 inches and the gap created by the seals 240, 242 is 0.5 inches, the total height of the membrane module 104, excluding the head and base plate assemblies 120 and 118, may be calculated as the total thickness of one hundred pairs of support plates 218 (0.012×2×100=2.4 inches) plus the total thickness of ninety-nine gaps (0.5× 99=49.5 inches). Accordingly, the total height is 51.9 inches. Therefore, the total volume occupied by the one hundred pairs of filter elements 122 in this exemplary embodiment is 13,701.6 cubic inches or 7.9 cubic feet. Accordingly, the filter surface area to volume ratio is approximately 46.5 $ft^2/ft^3$.

The membrane module may comprise a variety of alternative embodiments. For example, the stack of the filter elements may be mounted in a housing and the retentate, permeate, and process fluid conduits may be positioned in locations external of the filter elements. For example, the membrane support plates may have no central opening but the permeate sides of the membrane support plates may have grooves directed radially outwardly. The permeate may then flow towards the outer periphery of the filter elements to the external permeate conduits. By removing the conduits from the internal regions of the filter elements, the need for including isolating elements such as gaskets, seals and lands may be eliminated. Alternatively, instead of utilizing a single central opening 220 in each membrane support plate 218 to form the permeate conduit, individual axial conduits similar to but displaced from the process fluid and retentate conduits may be used.

As is the case with the membrane module, the filter elements may comprise any number of alternate embodiments. For example, the intermediate region of the membrane support plate may be impermeable but may have grooves or other channels formed in one or both sides of the support plate. The permeable membrane may be mounted to one or both sides of the membrane support plate as before; however, the permeate may drain through grooves to a permeate conduit rather than through holes in the plate.

The vibratory separation system of the present invention comprises a modular construction. Modular construction provides a far more reliable separation system because it can be much more extensively integrity tested, both during production and in the field. During production, every component of the separation system, e.g., every filter element, every base plate assembly, every head plate assembly may be tested prior to final assembly and testing. In the field, modular construction enables a single defective component of the separation system to be easily detected. Each membrane module may be individually tested to find a defective membrane module and then each component of the membrane module may be tested.

In addition, the modularly constructed separation system according to the present invention is rugged enough to be cleaned in place over many cycles and yet may be composed of lightweight materials such as plastics. Cleaning in place is greatly facilitated by many embodiments of the present invention. These embodiments include structural features which do not harbor contaminants and/or which give up contaminants freely during automatic cleaning in place. For example, surface finishes, in particular, of the metal components such as the base plate assembly and the head plate assembly may be mechanically prepared and polished, even electropolished, to decrease surface roughness to micron and sub-micron levels, giving contaminants a more tenuous attachment. In addition, the use of gaskets which protrude into the surrounding surfaces, and flush points eliminate crevices where contaminants may collect.

Although shown and described in what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be constructed to cohere of all modifications that may fall within the scope of the appended claims.

What is claimed is:

1. A vibratory separation system comprising:
   (a) a membrane module including an axis and a plurality of stacked filter elements, each filter element including a permeable membrane having an upstream surface and a downstream surface and a metal membrane support plate, the downstream surface of the permeable membrane being mounted to the metal membrane support plate in a first region, wherein the metal membrane support plate has a thickness in the range from about 0.002 inches to about 0.040 inches in the first region;
   (b) a vibratory drive mechanism coupled to the membrane module for imparting vibratory motion to the filter elements wherein the direction of vibration is in a plane perpendicular to the axis of the membrane module, thereby resisting fouling at the upstream surface of each permeable membrane;
   (c) a process fluid inlet communicating with the upstream surface of each permeable membrane; and
   (d) a permeate outlet communicating with the downstream surface of each permeable membrane.

2. The vibratory separation system according to claim 1 wherein the metal membrane support plate comprises an etched metal membrane support plate.

3. The vibratory separation system according to claim 1 wherein the metal membrane support plate includes one or more openings communicating with the process fluid inlet.

4. The vibratory separation system according to claim 3 wherein the one or more openings comprise circular holes.

5. The vibratory separation system according to claim 1 wherein the metal membrane support plate includes a process fluid side and a permeate side, wherein the permeate sides of the membrane support plates are secured to each other in pairs defining a permeate chamber between them.

6. The vibratory separation system according to claim 1 wherein the metal membrane support plate includes a second side, the filter element further comprising a permeable membrane mounted to the second side of the membrane support plate.

7. The vibratory separation system according to claim 1 further comprising a fibrous layer cooperatively arranged with the permeable membrane to drain fluid from the permeable membrane.

8. The vibratory separation system according to claim 1 wherein the vibratory drive mechanism includes a torsional element coupled to the membrane module to impart oscillatory vibratory motion to the membrane module.

9. The vibratory separation system according to claim 8 wherein the membrane module includes a base assembly and a head assembly, the filter elements being stacked between the base assembly and the head assembly, and wherein the torsional element is connected to the base assembly.

10. The vibratory separation system according to claim 8 wherein the torsional element comprises a torsional spring.

11. The vibratory separation system according to claim 1 further comprising a retentate outlet communicating with the upstream surface of each permeable membrane, the process fluid inlet, the retentate outlet and the permeate outlet each being coupled to the membrane module, wherein the membrane module includes a head assembly and a base assembly, the plurality of filter elements being stacked between the head assembly and the base assembly, and wherein the vibratory drive mechanism includes a torsion spring coupled to the membrane module to impart oscillatory vibratory motion to the membrane module.

12. The vibratory separation system according to claim 11 wherein the membrane module further includes process fluid chambers between the filter elements and wherein the filter elements include a first set of openings defining a process fluid conduit communicating between the process fluid inlet and the process fluid chambers and a second set of openings defining a retentate conduit communicating between the process fluid chambers and the retentate outlet.

13. The vibratory separation system according to claim 12 wherein the process fluid conduit is radially spaced from the retentate conduit.

14. The vibratory separation system according to claim 11 wherein the membrane module further includes a plurality of seals stacked with the filter elements to define process fluid chambers between the filter elements, a first set of openings defining a process fluid conduit communicating between the process fluid inlet and the process fluid chambers and a second set of openings of defining a retentate conduit communicating between the process fluid chambers and the retentate outlet, and wherein the metal membrane support plate has first and second opposite sides and the permeable membrane is mounted to the first side, each filter element further including a second permeable membrane mounted to the second side of the metal membrane support plate.

15. The vibratory separation system of claim 14 wherein the torsion spring is mounted to the base assembly and wherein the membrane module includes a permeate conduit communicating between the downstream surfaces of the permeate membranes and the permeate outlet and a plurality of bolts extending from the head assembly through the filter elements to the base assembly.

16. A vibratory separation system comprising:
(a) a membrane module including an axis and a plurality of filter elements, each filter element including a membrane support plate having an outer peripheral region and at least one permeable membrane having an upstream surface and a downstream surface, the downstream surface being mounted to the membrane support plate, the membrane module further including a process fluid chamber communicating with the upstream surface of each permeable membrane, the filter elements being secured to each other such that the outer peripheral regions are laminated and define a containment wall isolating the process fluid on one side of the wall;
(b) a vibratory drive mechanism coupled to the membrane module for imparting vibratory motion to the membrane module wherein the direction of vibration is in a plane perpendicular to the axis of the membrane module, thereby resisting fouling at the upstream surface of each permeable membrane;
(c) a process fluid inlet communicating with each process fluid chamber;
(d) a permeate outlet communicating with the downstream surface of each permeable membrane.

17. The vibratory separation system according to claim 16 wherein the membrane support plate includes a process fluid side and a permeate side, and wherein the permeate sides of adjacent filter elements are secured to each other as a pair and define a permeate chamber between them.

18. The vibratory separation system according to claim 16 wherein the vibratory drive mechanism includes a torsional element coupled to the membrane module to impart oscillatory vibratory motion to the membrane module.

19. The vibratory separation system according to claim 16 wherein the membrane module includes a head assembly, a base assembly and plurality of bolts, the bolts extending from the head assembly through the containment wall to the base assembly.

20. The vibratory separation system according to claim 16 wherein the containment wall isolates the process fluid from the ambient environment on the other side of the wall.

21. The vibratory separation system according to claim 16 wherein the membrane support plate includes first and second opposite sides, the permeable membrane being mounted to the first side and, the filter element further comprising second permeable membrane mounted to the second side of the membrane support plate.

22. The vibratory separation system according to claim 21 wherein the membrane support plate includes a through hole in fluid communication with the process fluid inlet and sealed from the downstream surfaces of the permeable membranes to prevent fluid flow between the downstream surfaces of the permeable membranes and the through hole.

23. The vibratory separation system according to claim 22 wherein the membrane support plate further includes at least one through hole in fluid communication with the downstream surfaces of the permeable membranes.

24. The vibratory separation system of claim 16 wherein the membrane module further comprises a retentate outlet communicating with the upstream surface of each permeable membrane, the process fluid inlet, the retentate outlet and the permeate outlet being coupled to the membrane module, wherein the membrane module includes a head assembly and a base assembly, the containment wall extending between the head assembly and the base assembly, and the membrane module further includes a plurality of process fluid chambers between adjacent filter elements, a first set of opening defining a process fluid conduit communicating between the process fluid inlet and the process fluid chambers, and a second set of openings defining a retentate conduit communicating between the process fluid chambers and the retentate outlet, and wherein the vibratory drive mechanism includes a torsion spring mounted to the membrane module to impart oscillatory vibratory motion to filter elements.

25. The vibratory separation system of claim 24 wherein the membrane module includes a plurality of seals, the containment wall comprising a stack of the seals and filter elements, wherein each membrane support plate has first and second sides and the downstream surfaces of first and second permeable membranes are respectively mounted to the first and second sides, and wherein the membrane module includes a permeate conduit communicating between the downstream sides of the permeable membranes and the permeate conduit.

26. The vibratory separation system of claim 25 wherein the intermediate regions of the permeate sides of the membrane support plates include a least one protrusion extending from the surface of the permeate side of the support plate and wherein the permeate sides of the membrane support plates are secured to each other such that the protrusion from one plate contacts the protrusion from another plate.

27. The vibratory separation system of claim 16 wherein the membrane module further comprises a plurality of seals, the filter elements and seals being stacked to define the containment wall.

28. The vibratory separation system of claim 27 wherein the seals comprise gaskets.

29. The vibratory separation system of claim 27 wherein the seals and filter elements are sealed to one another.

30. The vibratory separation system of claim 27 wherein the membrane module includes a head assembly, a base assembly and a plurality of bolts, the seals and the filter elements having a plurality of holes and the bolts extending from the head assembly through the holes in the seals and the filter elements to the base assembly.

31. The vibratory separation system according to claim 16 wherein the containment wall isolates the process fluid and the permeate on one side of the wall.

32. A vibratory separation system comprising:
   (a) a generally cylindrical membrane module including a plurality of thin metal membrane support plates, wherein each thin metal membrane support plate has an inner peripheral region, an outer peripheral region, and a region intermediate the inner and outer peripheral regions, and a plurality of permeable membranes, wherein each permeable membrane includes an upstream surface and a downstream surface and mounted on the downstream surface to the intermediate region of the thin metal membrane support plate, the plurality of thin metal membrane support plates being secured to one another by laminating the outer peripheral regions to define an outer wall and by laminating the inner peripheral regions to define an inner wall;
   (b) a vibratory drive mechanism coupled to the membrane module for imparting vibratory motion to the membrane module, thereby resisting fouling at the upstream surface of the each permeable membrane;
   (c) a process fluid inlet communicating with upstream surfaces of the permeable membranes; and
   (d) a permeate outlet communicating with the downstream surfaces of the permeable membranes.

33. The vibratory separation system according to claim 32 wherein the membrane module further comprises a plurality of seals, the thin metal membrane support plates and seals being stacked to define the outer wall and to define the inner wall.

34. The vibratory separation system according to claim 32 wherein the thin metal membrane support plates are arranged in pairs defining a permeate chamber between the paired support plates.

35. The vibratory separation system according to claim 32 wherein each thin metal membrane support plate has first and second opposite sides, wherein the permeable membrane is mounted to the first side and wherein the membrane module further includes a second permeable membrane mounted to each second side.

36. A membrane separation unit for use with a vibratory drive mechanism which imparts vibratory motion to the membrane separation unit wherein the vibratory motion is in a plane perpendicular to an axis of the membrane separation unit comprising:
   (a) a membrane module including a plurality of stacked filter elements, each filter element including a permeable membrane having an upstream surface and a downstream surface and a metal membrane support plate, the downstream surface of the permeable membrane being mounted to the metal membrane support plate in a first region, wherein the metal membrane support plate has a thickness in the range from about 0.002 inches to about 0.040 inches in the first region;
   (b) a process fluid inlet coupled to the membrane module and communicating with the upstream surface of the permeable membranes, the process fluid inlet introducing process fluid to the membrane module;
   (c) a permete outlet coupled to the membrane module and communicating with the dowsntream surface of the permeable membranes, the permeate outlet facilitating the removal of permeate from the membrane module; and
   (d) a retentate outlet coupled to the membrane module and communicating with the upstream surface of the permeable membranes, the retentate outlet facilitating the removal of retentate from the membrane module, wherein said membrane separation unit is adapted to be connected to said vibratory drive mechanism.

37. The membrane separation unit according to claim 36 wherein the metal membrane support plate comprises an etched metal membrane support plate.

38. The membrane separation unit according to claim 36 wherein the metal membrane support plate includes one or more openings communicating with the process fluid inlet.

39. The vibratory separation system according to claim 38 wherein the one or more openings comprise circular holes.

40. The vibratory separation system according to claim 36 wherein the metal membrane support plate includes a process fluid side and a permeate side, wherein the permeate sides of the membrane support plates are secured to each other in pairs defining a permeate chamber between them.

41. The membrane separation unit according to claim 36 wherein the metal membrane support plate includes a through hole in fluid communication with the process fluid inlet and sealed from the downstream surface of the permeable membrane to prevent fluid flow between the downstream surface of the permeable membrane and the through hole.

42. The membrane separation unit according to claim 36 wherein the filter element further comprises a fibrous layer cooperatively arranged with the permeable membrane to drain fluid from the permeable membrane.

43. The membrane separation unit according to claim 36 wherein the permeable membrane is bonded to the membrane support plate.

44. The membrane separation unit according to claim 36 wherein the membrane separation unit further includes a plurality of seals stacked with the filter elements to define process fluid chambers between the filter elements.

45. The membrane separation unit according to claim 36 wherein the membrane module has a filter surface area to volume ratio of at least about 3 $ft^2/ft^3$.

46. The membrane separation unit according to claim 45 wherein the membrane module has a filter surface area to volume ratio of at least about 100 $ft^2/ft^3$.

47. The membrane separation unit according to claim 36 wherein the membrane support plate includes a second side, the filter element further comprising a permeable membrane mounted to the second side of the membrane support plate.

48. The membrane separation unit according to claim 47 further comprising a through hole in fluid communication with the process fluid inlet and sealed from the downstream surfaces of the permeable membranes to prevent fluid flow between the downstream surfaces of the permeable membranes and the through hole.

49. The membrane separation unit according to claim 48 wherein the membrane support plate further includes at least one through hole in fluid communication with the downstream surface of the permeable membrane.

50. A membrane separation unit for use with a vibratory drive mechanism which imparts vibratory motion to the membrane separation unit wherein the vibratory motion is in a plane perpendicular to an axis of the membrane separation unit comprising:

(a) a membrane module including a plurality of filter elements, each filter element including a thin metal membrane support plate having an outer peripheral region and at least one permeable membrane having an upstream surface and a downstream surface, the dowsntream surface being mounted to the membrane support plate, the membrane module further including a process fluid chamber communicating with an upstream surface of each permeable membrane, the filter elements being secured to each other such that the outer peripheral regions are laminated and define a containment wall isolating the process fluid on one side of the wall;

(b) a process fluid inlet coupled to the membrane module and communicating with each process fluid chamber, the process fluid inlet introducing process fluid to the membrane module;

(c) a permeate outlet coupled to the membrane module and communicating with a downstream surface of each permeable membrane, the permeate outlet facilitating the removal of permeate from the membrane module; and (d) a retentate outlet coupled to the membrane module and communicating with each process fluid chamber, the retentate outlet facilitatting the removal of retentate from the membrane module, wherein sid membrane separation unit is adapted to be connected to said vibratory drive mechanism.

51. The membrane separation unit according to claim 50 wherein the membrane support plate includes a process fluid side and a permeate side, and wherein the permeate sides of adjacent filter elements are secured to each other as a pair and define a permeate chamber between them.

52. The membrane separation unit according to claim 50 wherein the membrane module includes a plurality of seals, the containment wall comprising a stack of the seals and filter elements.

53. The membrane separation unit according to claim 52 wherein the membrane module includes process fluid chambers between adjacent filter elements, process fluid conduits extending through the filter elements and communicating between the process fluid inlet and the process fluid chambers, and retentate conduits extending through the filter elements and communicating between the process fluid chambers and the retentate outlet.

54. The membrane separation unit according to claim 50 wherein the containment wall isolates the process fluid from the ambient environment on the other side of the wall.

55. The membrane separation unit according to claim 50 wherein the containment wall further isolates permeate on one side of the wall.

56. The membrane separation unit according to claim 50 wherein the membrane support plate has first and second opposite sides, wherein the permeable membrane is mounted to the first side and wherein the membrane module further includes a second permeable membrane mounted to the second side of each membrane support plate.

57. A membrane separation unit comprising:

(a) a generally cylindrical membrane module including a plurality of thin metal membrane support plates, wherein each thin metal membrane support plate has an inner peripheral region, an outer peripheral region, a region intermediate the inner and outer peripheral regions, and a plurality of permeable membranes, wherein each permeable membrane includes an upstream surface and a downstream surface and is mounted on the downstream surface to the intermediate region of each of the thin metal membrane support plates, the plurality of thin metal membrane support plates being secured by laminating the outer peripheral regions to define an outer wall and by laminating the inner peripheral regions to define an inner wall;

(b) a process fluid inlet coupled to the membrane module and communicating with upstream surfaces of the permeable membranes, the process fluid inlet introducing process fluid to the membrane module;

(c) a permeate outlet coupled to the membrane module and communicating with downstream surfaces of the permeable membranes, the permeate outlet facilitating the removal of permeate from the membrane module; and (d) a retentate outlet coupled to the membrane module and communicating with the upstream surfaces of the permeable membranes, the retentate outlet facilitating the removal of retentate from the membrane module.

58. The membrane separation unit according to claim 51 wherein the outer wall isolates the process fluid and permeate on one side of the wall from the ambient environment on the other side of the wall.

59. The membrane separation unit according to claim 51 wherein the membrane module includes a permeate conduit in fluid communication with the downstream surface of the permeable membrane and the permeate outlet.

60. The membrane separation unit according to claim 59 wherein the inner wall isolates process fluid on one side of the wall from the permeate conduit on the other side of the wall.

61. The membrane separation unit according to claim 51 wherein the membrane support plate includes first and second opposite sides, the permeable membrane being mounted to the first side and, the filter element further comprising a second permeable membrane mounted to the second side of the membrane support plate.

62. The membrane separation unit according to claim 51 wherein the membrane support plate includes a process fluid side and a permeate side and wherein the permeate sides of adjacent filter elements are secured to each other as a pair and define a permeate chamber between them.

63. The membrane separation unit according to claim 62 wherein the process fluid is isolated on one side of the inner wall and the permeate chamber is in communication with the other side of the inner wall.

64. The membrane separation unit according to claim 51 wherein the membrane module further comprises a plurality of seals, the filter elements and seals being stacked to define the outer wall and to define the inner wall.

65. The membrane separation unit according to claim 51 wherein the membrane module includes process fluid chambers between adjacent filter elements, process fluid conduits extending through the filter elements and communicating between the process fluid inlet and the process fluid chambers, and retentate conduits extending through the filter elements and communicating between the process fluid chambers and the retentate outlet.

66. A membrane separation unit comprising:
(a) a membrane module including a plurality of stacked filter elements, wherein each filter element includes a permeable membrane having an upstream surface and a downstream surface, and a membrane support plate, the downstream surface of the permeable membrane being mounted to the membrane support plate, a head plate assembly having a substantially concave lower surface, and a base plate assembly having a substantially convex upper surface, the plurality of stacked filter elements being mounted between the head plate assembly and the base plate assembly thereby configuring the membrane support plates into a substantially concial shape;
(b) a process fluid inlet coupled to the membrane module and communicating with the upstream surface of each of the permeable membranes;
(c) a permeate outlet coupled to the membrane module and communicating with the downstream surface of each of the permeable membranes; and
(d) a retentate outlet coupled to the membrane module and communicating with the upstream surface of each of the permeable membranes.

67. The membrane separation unit according to claim 66 wherein the base plate upper surface includes a substantially flat outer periphery and a substantially flat inner periphery and a region between the inner and out peripheries slopes from the outer periphery toward the inner periphery.

68. The membrane separation unit according to claim 66 wherein the head plate lower surface includes a substantially flat outer periphery and a substantially flat inner periphery and a region between the inner and outer peripheries slopes from the outer periphery toward the inner periphery.

69. A membrane separation unit comprising:
(a) a membrane module including a plurality of stacked filter elements, wherein each filter element includes a permeable membrane having an upstream surface and a downstream surface, and a membrane support plate the downstream surface of the permeable membrane being mounted to the membrane support plate in a first region having a thickness in the range from about 0.002 inch to about 0.040 inch, and wherein the membrane module has a filter surface area to volume ratio of at least about 3 $ft^2/ft^3$, the filter elements being secured to each other such that open channels are formed between permeable membranes, the open channels being substantially free of structure;
(b) a process fluid inlet coupled to the membrane module and communicating with the open channels, the process fluid inlet introducing process fluid to the membrane module;
(c) a permeate outlet coupled to the membrane module and communicating with the downstream surface of the permeable membranes, the permeate outlet facilitating the removal of permeate from the membrane module; and
(d) a retentate outlet coupled to the membrane module and communicating with the open channels for facilitating the removal of retentate from the membrane module.

* * * * *